(12) United States Patent
Kim et al.

(10) Patent No.: US 12,621,383 B2
(45) Date of Patent: May 5, 2026

(54) WATERPROOF DEVICE FOR DIVING AND METHOD FOR OPERATING SAME

(71) Applicant: ARTISAN AND OCEAN CO., LTD., Gunpo-si (KR)

(72) Inventors: Jung Il Kim, Seoul (KR); Woocheol Im, Seoul (KR)

(73) Assignee: ARTISAN AND OCEAN CO., LTD., Gunpo-si (KR)

( * ) Notice: Subject to any disclaimer, the term of this patent is extended or adjusted under 35 U.S.C. 154(b) by 308 days.

(21) Appl. No.: 18/236,627

(22) Filed: Aug. 22, 2023

(65) Prior Publication Data

US 2023/0396703 A1 Dec. 7, 2023

Related U.S. Application Data

(63) Continuation of application No. PCT/KR2022/016213, filed on Oct. 24, 2022.

(30) Foreign Application Priority Data

Jan. 26, 2022 (KR) ........................ 10-2022-0011100
Oct. 24, 2022 (KR) ........................ 10-2022-0136998

(51) Int. Cl.
| | |
|---|---|
| *H04M 1/72409* | (2021.01) |
| *B63C 11/26* | (2006.01) |
| *H04M 1/7246* | (2021.01) |
| *B63C 11/02* | (2006.01) |
| *H04M 1/72412* | (2021.01) |

(52) U.S. Cl.
CPC ....... *H04M 1/724092* (2022.02); *B63C 11/26* (2013.01); *H04M 1/7246* (2021.01); *B63C 2011/021* (2013.01); *H04M 1/72412* (2021.01)

(58) Field of Classification Search
CPC ......... H04M 1/724092; H04M 1/7246; H04M 1/72412; H04M 1/18; B63C 11/26; B63C 2011/021; G01L 5/00; A45C 11/22; H04L 67/12
See application file for complete search history.

(56) References Cited

U.S. PATENT DOCUMENTS

| | | | |
|---|---|---|---|
| 10,852,770 B2 | 12/2020 | Ichikawa et al. | |
| 10,991,049 B1 * | 4/2021 | Devereaux | ................. G06T 7/73 |
| 2013/0025904 A1 * | 1/2013 | Berumen | .............. G06F 1/1626 |
| | | | 29/428 |

(Continued)

FOREIGN PATENT DOCUMENTS

| | | |
|---|---|---|
| CN | 109029441 A | 12/2018 |
| CN | 109029441 B | 12/2021 |

(Continued)

*Primary Examiner* — Angelica Perez
(74) *Attorney, Agent, or Firm* — NSIP Law

(57) ABSTRACT

The present invention relates to a waterproof device for diving including a mobile terminal and an openable and closable waterproof housing for diving adapted to detachably mount the mobile terminal thereonto, wherein the mobile terminal includes an I/O module for displaying at least one of an information pop-up and a functional mode, a first sensor part for detecting internal pressure of the waterproof housing for diving, and a control unit for determining whether the waterproof housing for diving is normally fastened using the detected internal pressure.

20 Claims, 16 Drawing Sheets

(56)          References Cited

U.S. PATENT DOCUMENTS

2018/0356861 A1    12/2018   Ichikawa et al.

FOREIGN PATENT DOCUMENTS

| | | | | | |
|---|---|---|---|---|---|
| JP | 2001-333814 | A | | 12/2001 | |
| JP | 2012-74798 | A | | 4/2012 | |
| JP | 2012074798 | A | * | 4/2012 | |
| JP | 5662753 | B2 | | 2/2015 | |
| JP | 2019-2900 | A | | 1/2019 | |
| JP | 2019002900 | A | * | 1/2019 | |
| JP | 6638713 | B2 | | 1/2020 | |
| KR | 10-2021-0054291 | A | | 5/2021 | |
| KR | 10-2021-0054305 | A | | 5/2021 | |
| KR | 10-2253958 | B1 | | 5/2021 | |
| KR | 20210054291 | A | * | 5/2021 | ........... A45C 11/003 |
| KR | 10-2261604 | B1 | | 6/2021 | |
| KR | 10-2279887 | B1 | | 7/2021 | |
| KR | 10-2021-0147502 | A | | 12/2021 | |
| KR | 20210147502 | A | * | 12/2021 | ............. G08B 21/02 |
| KR | 10-2378593 | B1 | | 3/2022 | |

* cited by examiner

Water level
0.0
NDL
99'
Diving time
0'
Water temperature
23°C

Please turn on flight mode

Diving mode end

General    OFF

WATERPROOF DEVICE FOR DIVING AND METHOD FOR OPERATING SAME

CROSS-REFERENCE TO RELATED APPLICATIONS

Pursuant to 35 USC 120 and 365(c), this application is a continuation of International Application No. PCT/KR2022/016213 filed on Oct. 24, 2022, and claims the benefit under 35 USC 119(a) of Korean Patent Application No. 10-2022-0011100 filed on Jan. 26, 2022 and Korean Patent Application No. 10-2022-0136998 filed on Oct. 24, 2022, in the Korean Intellectual Property Office, the entire disclosures of which are incorporated herein by reference for all purposes.

BACKGROUND

1. Field

The present invention relates to a waterproof device for diving and a method for operating the same.

2. Description of the Related Art

Generally, a waterproof device for diving is used to provide safety and convenience functions for diving for a user who dives into water, and as scuba diving becomes popular, such a waterproof device for diving has widely prevailed in daily lives of people.

Examples of the waterproof device for diving include a dive watch, a dive computer, and a dive camera, but because they are very expensive, actually, it is hard to buy them readily.

Recently, a variety of all-in-one waterproof devices for diving each providing such functions for the user, have been developed, and further, because of popularization and performance improvement of a mobile terminal, many studies of all-in-one dive products have been actively made so as to permit the mobile terminal used daily by a user to be usable during his or her diving.

However, the mobile terminal does not have enough components for underwater use. To solve such a problem, a mobile terminal waterproof housing has been developed to allow the mobile terminal to be usable in the case where a user dives into deep water.

With current technologies, however, it is actually difficult that a user who is in deep water checks a water level using the mobile terminal or determines whether the mobile terminal waterproof housing is normally fastened.

Besides, if the mobile terminal waterproof housing is used during the user's diving, it is hard for the user to recognize a touch on the mobile terminal under water, thereby making it difficult to execute and control a program of the mobile terminal.

PRIOR ART LITERATURE

Patent Literature (Patent literature 0001) Korean Patent No. 10-2261604 ("Self-inspecting device for waterproof performance", Samsung Electronics Co., Ltd., Jun. 1, 2021)
(Patent literature 0002) Japanese Patent Application Laid-open No. 2001-333814 ("Waterproof case", ASAHI RESEARCH CORP, Dec. 4, 2001)

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Accordingly, the present invention has been made in view of the above-mentioned problems occurring in the related art, and it is an object of the present invention to provide a waterproof device for diving and a method for operating the same that are capable of determining whether a waterproof housing for diving is normally or abnormally fastened above water or under water to thus control operations of a diving application.

To accomplish the above-mentioned object, according to the present invention, there are provided a waterproof device for diving and a method for operating the same.

According to one aspect of the present invention, a waterproof device for diving may include a mobile terminal and an openable and closable waterproof housing for diving adapted to detachably mount the mobile terminal thereonto, wherein the mobile terminal may include an I/O module for displaying at least one of an information pop-up and a functional mode, a first sensor part for detecting internal pressure of the waterproof housing for diving, and a control unit for determining whether the waterproof housing for diving is normally fastened using the detected internal pressure.

If it is determined through the control unit that the waterproof housing for diving is normally fastened, the I/O module may display at least one of the information pop-up and the functional mode.

If connection setting of the mobile terminal corresponds to the information pop-up, the I/O module may display the functional mode.

The I/O module may display the information pop-up having at least one of a Bluetooth connection inducing pop-up and a preparation and caution information pop-up before diving and the functional mode having at least one of a diving mode and a camera mode.

The control unit may determine whether the internal pressure is in an error range of pre-stored basic internal pressure, and if the internal pressure is in the error range of the pre-stored basic internal pressure, the I/O module may release the functional mode and perform conversion into a home screen.

The control unit may determine whether the waterproof housing for diving is normally or abnormally fastened using a difference between the internal pressure after the waterproof housing for diving has been closed and the basic internal pressure before the waterproof housing for diving is closed.

The waterproof device for diving may further include a waterproof auxiliary unit for diving having a second sensor part adapted to detect external pressure of the waterproof housing for diving.

The control unit may determine whether the waterproof device for diving is currently located above water or under water using the detected external pressure.

If it is determined that the waterproof device for diving is currently located above water, the control unit may determine whether the waterproof housing for diving is normally or abnormally fastened according to a difference value between the internal pressure and the external pressure.

If it is determined that the waterproof housing for diving is normally fastened, the control unit may determine whether water leakage occurs from the waterproof housing for diving according to a determination as to whether an inclination of the internal pressure at predetermined intervals is a negative number.

If it is determined that the waterproof device for diving is currently located under water, the control unit may calculate a water level of the waterproof device for diving, based on the external pressure, and determine whether the waterproof housing for diving is normally or abnormally fastened using the calculated water level and the difference between the external pressure and the internal pressure.

If it is determined that the waterproof housing for diving is normally fastened, the control unit may determine whether water leakage occurs from the waterproof housing for diving according to a determination as to whether an inclination of the internal pressure at predetermined intervals is a positive number.

The control unit may detect whether the normal fastened state determination is performed, and based on pre-stored models of mobile terminals covered by insurance, thus determine whether the mobile terminal is covered by the insurance.

The control unit may transmit water leakage occurrence to a customer center server.

According to another aspect of the present invention, there is provided a method for operating a waterproof device for diving having a mobile terminal for detecting internal pressure and an openable and closable waterproof housing for diving adapted to detachably mount the mobile terminal thereonto, the method including the steps of: detecting the internal pressure of the waterproof housing for diving; determining whether the waterproof housing for diving is normally fastened using the detected internal pressure; and displaying at least one of an information pop-up and a functional mode.

In the step of displaying at least one of an information pop-up and a functional mode, if it is determined that the waterproof housing for diving is normally fastened, at least one of the information pop-up and the functional mode may be displayed.

In the step of displaying at least one of an information pop-up and a functional mode, if connection setting of the mobile terminal corresponds to the information pop-up, the functional mode may be displayed.

In the step of displaying at least one of an information pop-up and a functional mode, the information pop-up having at least one of a Bluetooth connection inducing pop-up and a preparation and caution information pop-up before diving and the functional mode having at least one of a diving mode and a camera mode may be displayed.

The method for operating the waterproof device for diving may further include the steps of: determining whether the internal pressure is in an error range of pre-stored basic internal pressure; and if the internal pressure is in the error range of the pre-stored basic internal pressure, releasing the functional mode and performing conversion into a home screen.

The step of determining whether the waterproof housing for diving is normally fastened may be carried out to determine whether the waterproof housing for diving is normally or abnormally fastened using a difference between the internal pressure after the waterproof housing for diving has been closed and the basic internal pressure before the waterproof housing for diving is closed.

BRIEF DESCRIPTION OF THE DRAWINGS

These and/or other aspects of the disclosure will become apparent and more readily appreciated from the following

Figure 1:
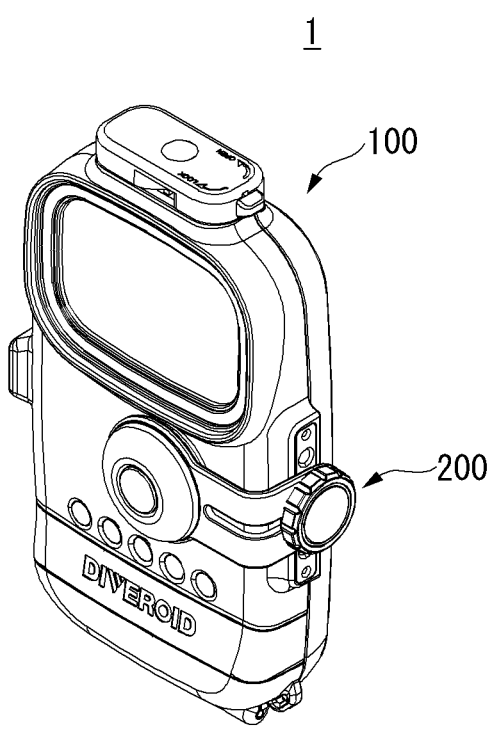
Figure 2:
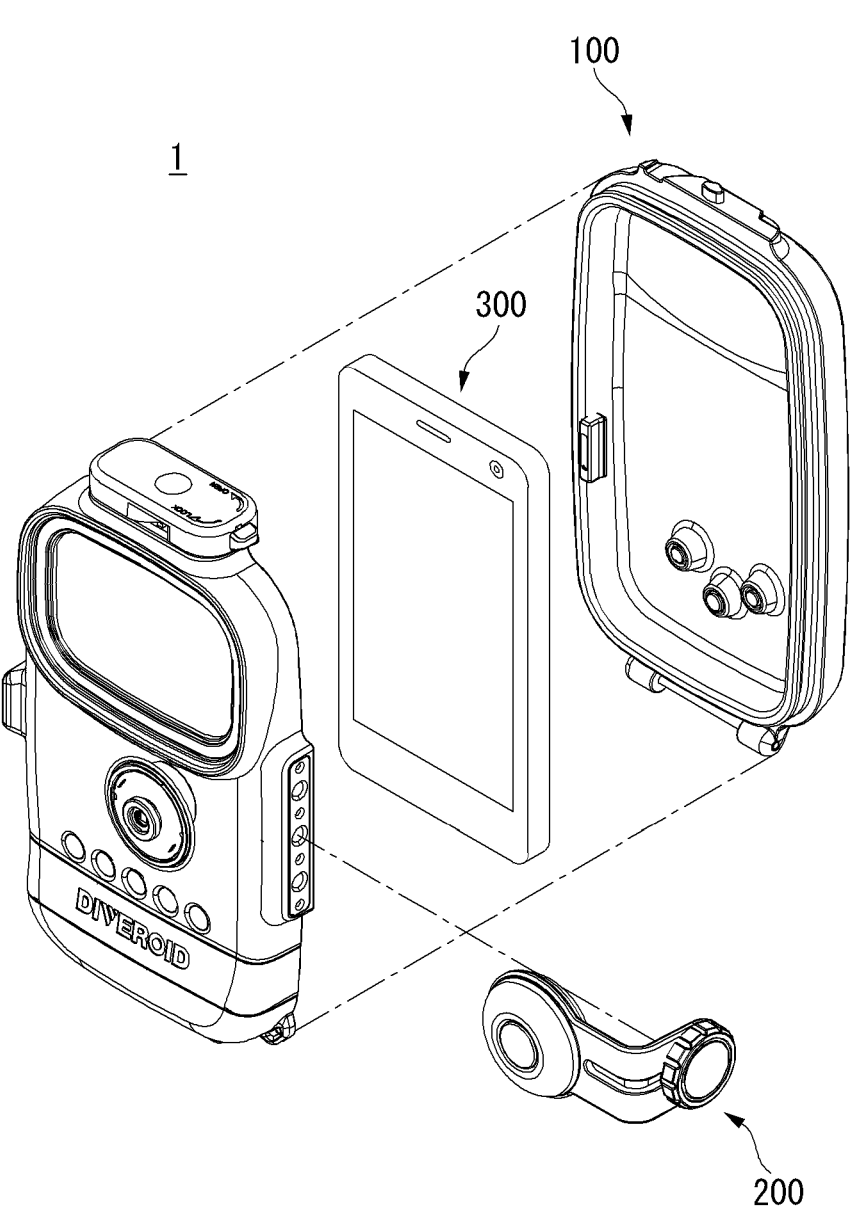

4 description of the embodiments, taken in conjunction with the accompanying drawings of which:

FIGS. 1 and 2 show a waterproof device for diving according to the present invention.

Figure 3:
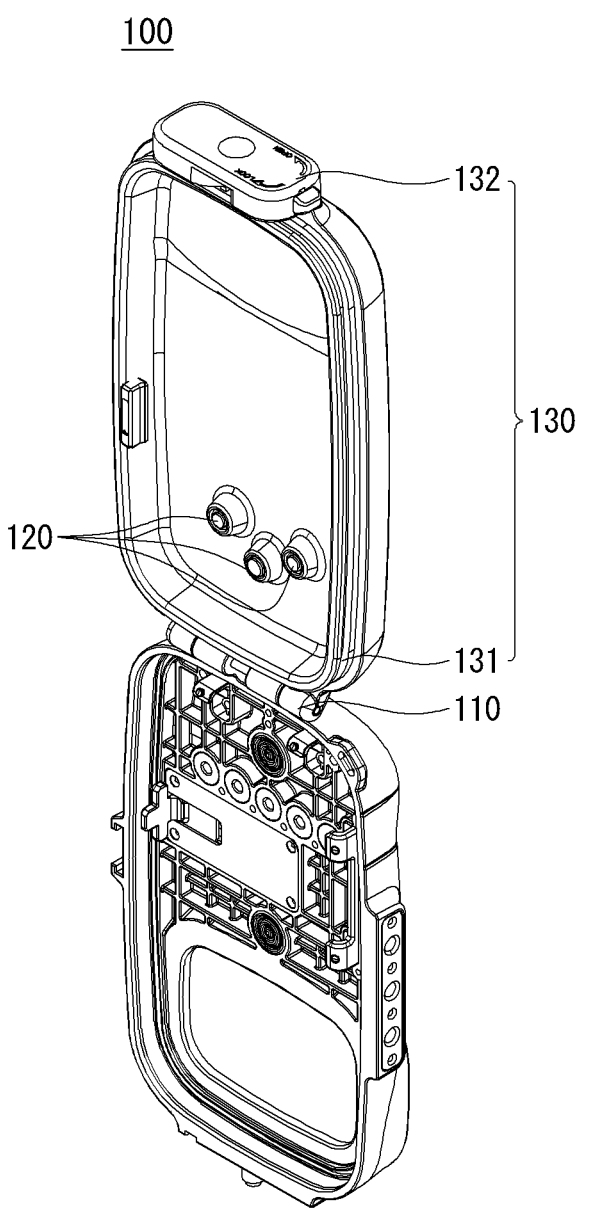
Figure 4:
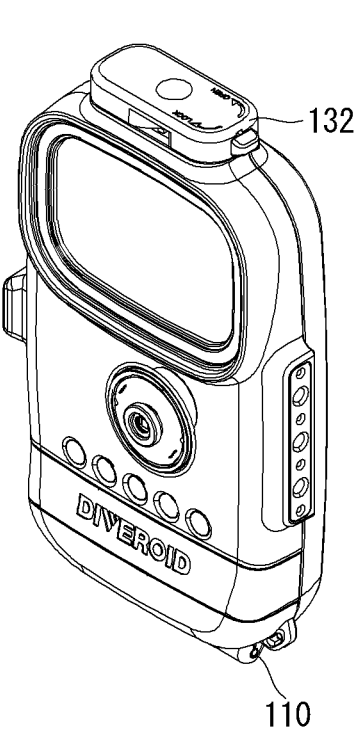

FIGS. 3 and 4 show a waterproof housing for diving according to the present invention.

Figure 5:
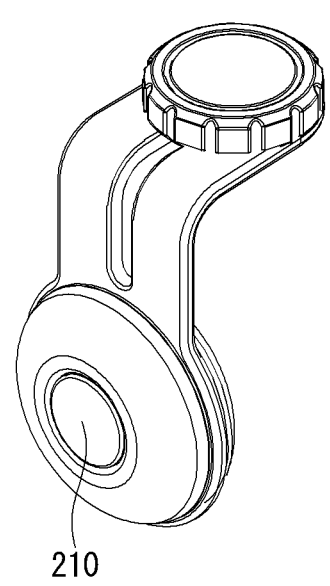

FIG. 5 shows an outer appearance of a waterproof auxiliary unit for diving according to the present invention.

Figure 6:
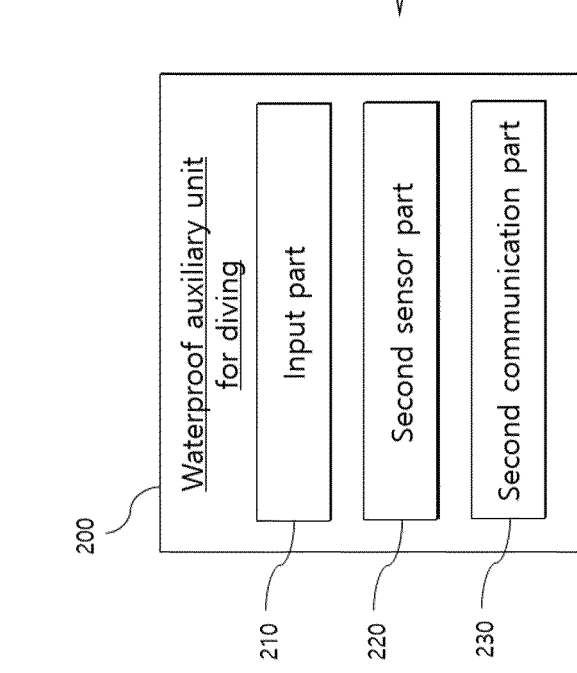

FIG. 6 is a block diagram showing a configuration of the waterproof device for diving according to the present invention.

Figure 7:
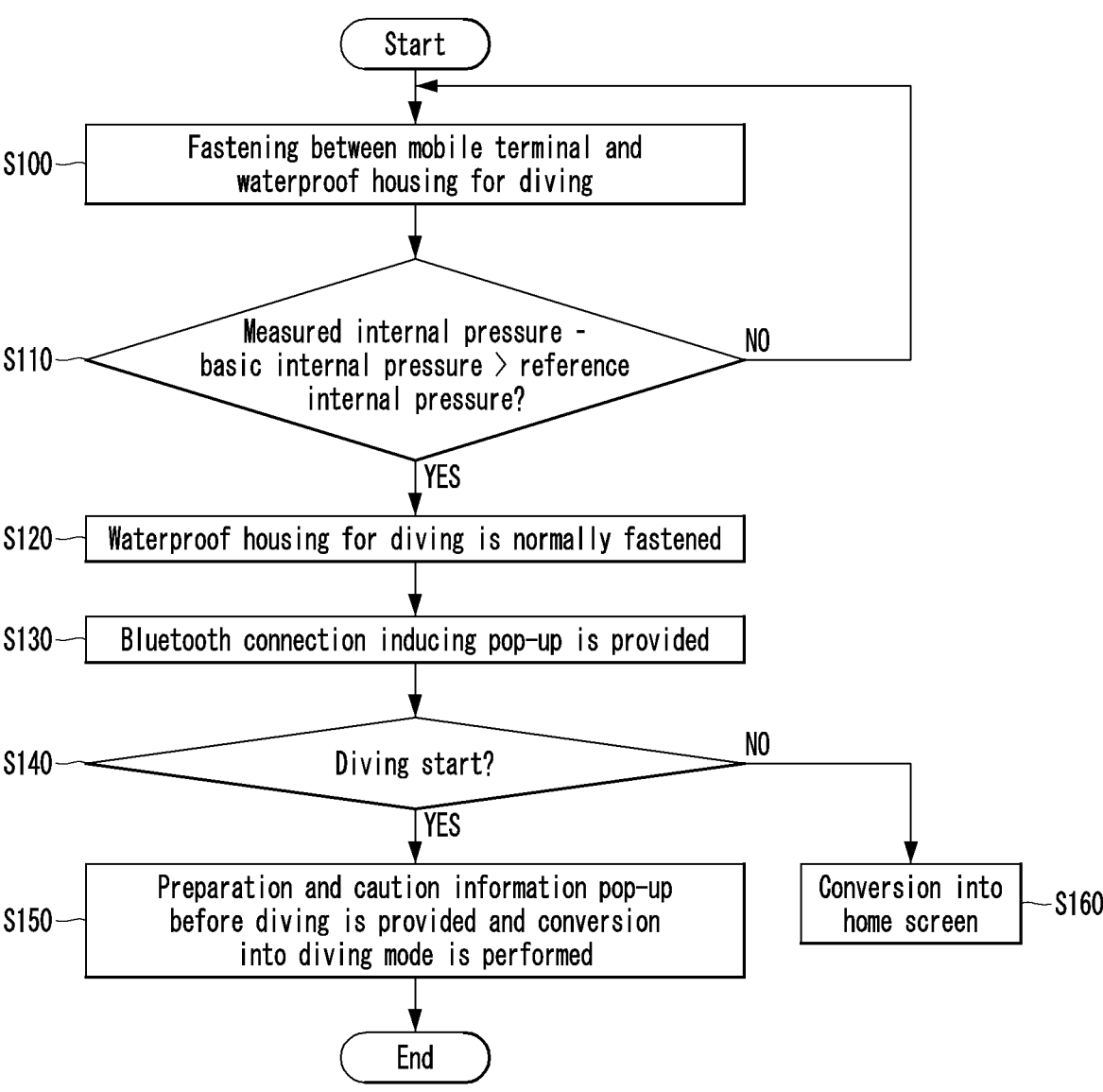

FIG. 7 is a flowchart showing a method for determining whether the waterproof device for diving according to the present invention is normally fastened.

Figure 8:
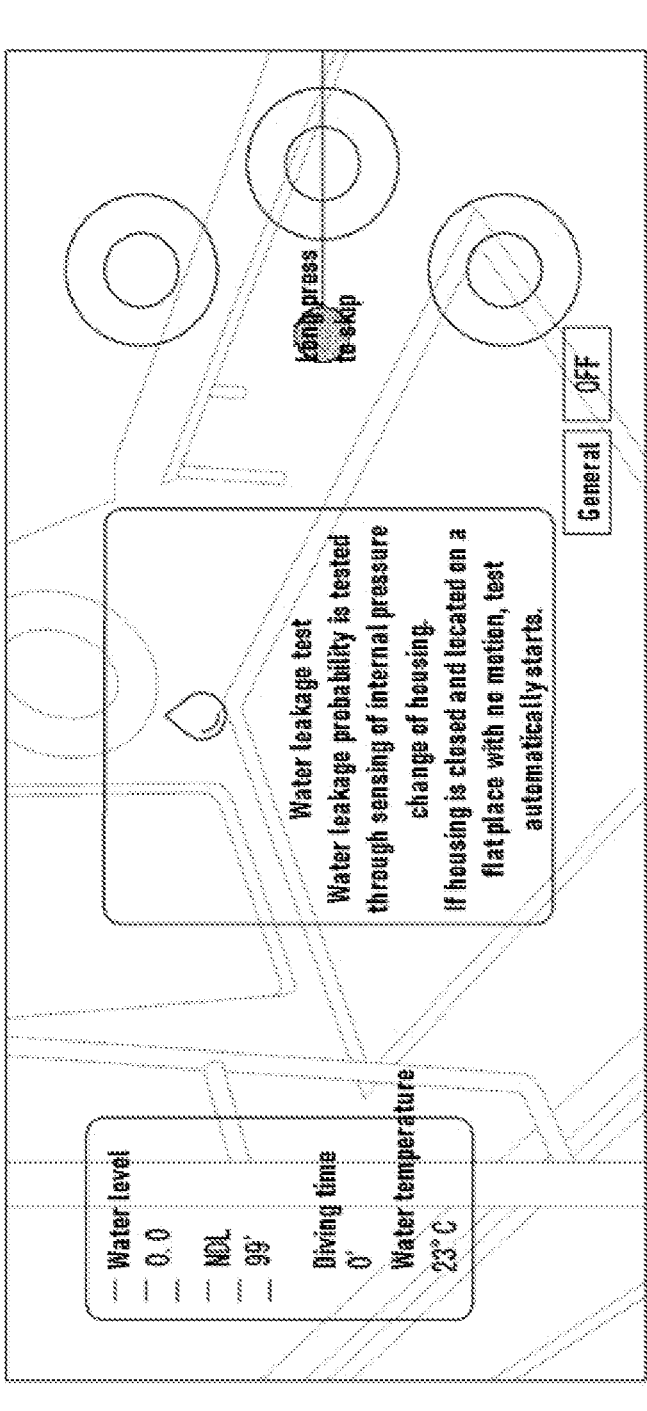

FIG. 8 is an exemplary view showing a water leakage test.

Figure 9:
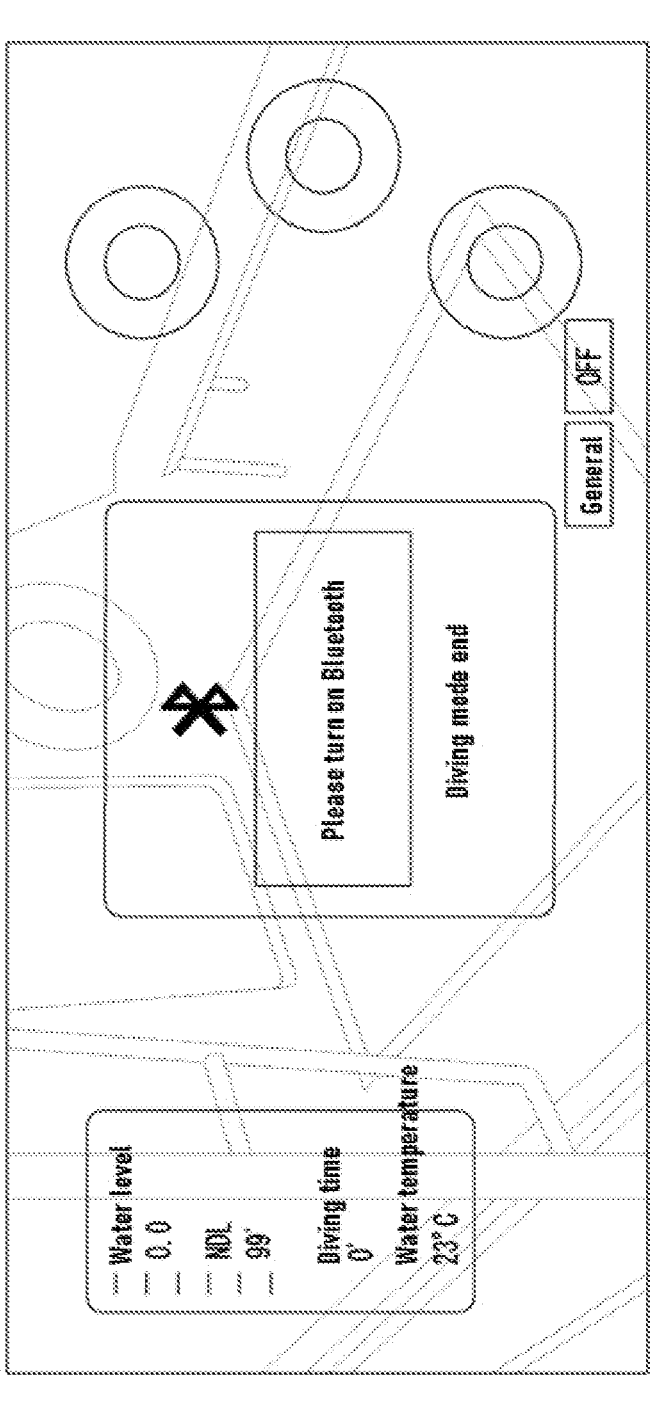
Figure 10:
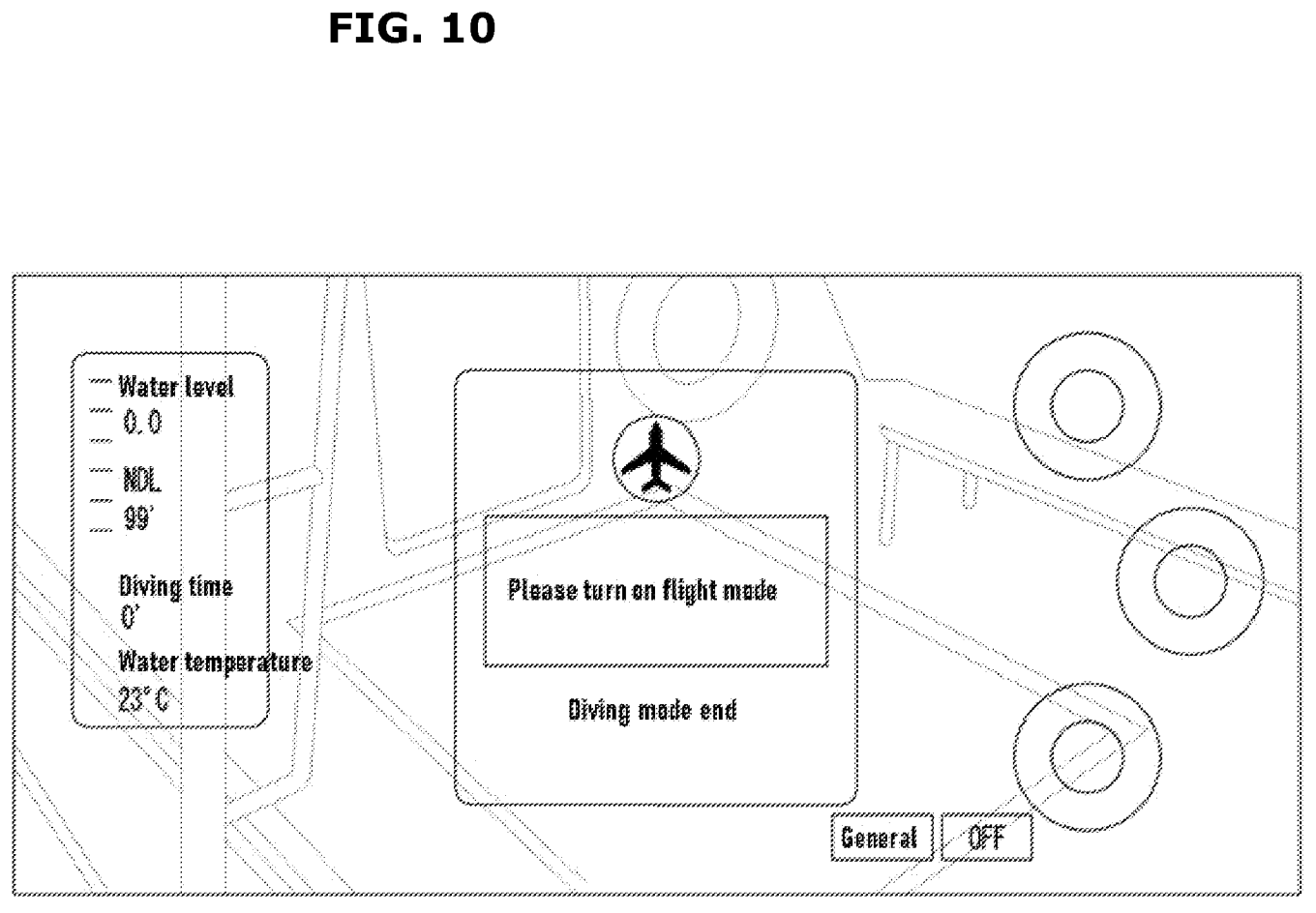

FIGS. 9 and 10 are exemplary views showing a Bluetooth connection inducing pop-up.

Figure 11:
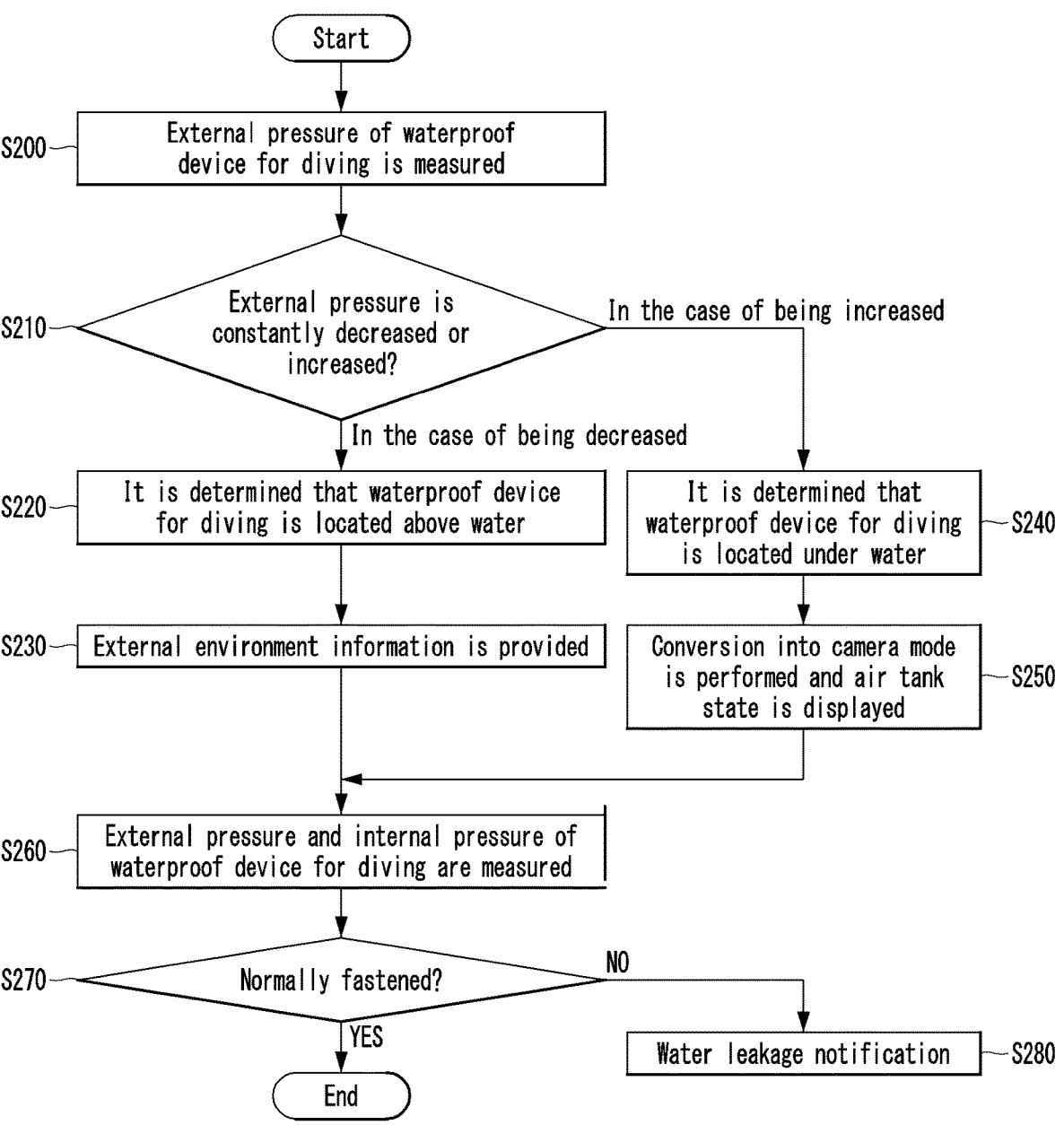

FIG. 11 is a flowchart showing a method for operating the waterproof device for diving according to an embodiment of the present invention.

Figure 12:
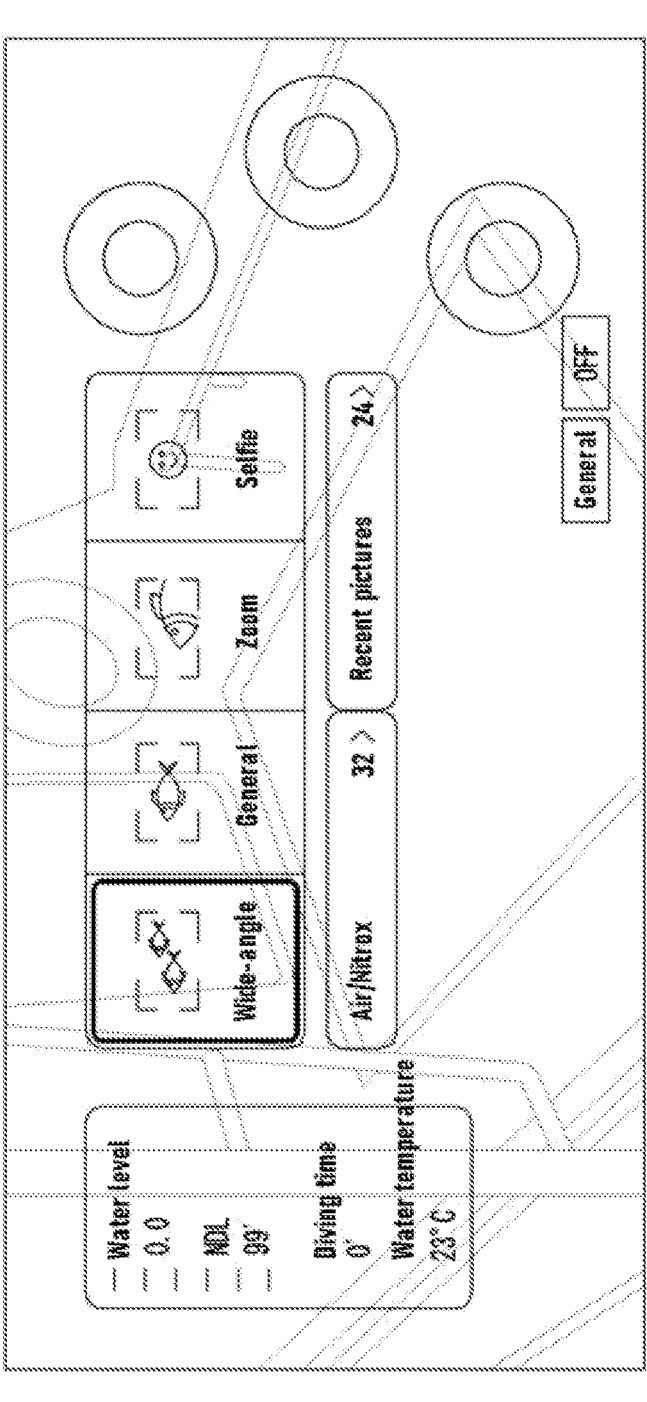
Figure 13:
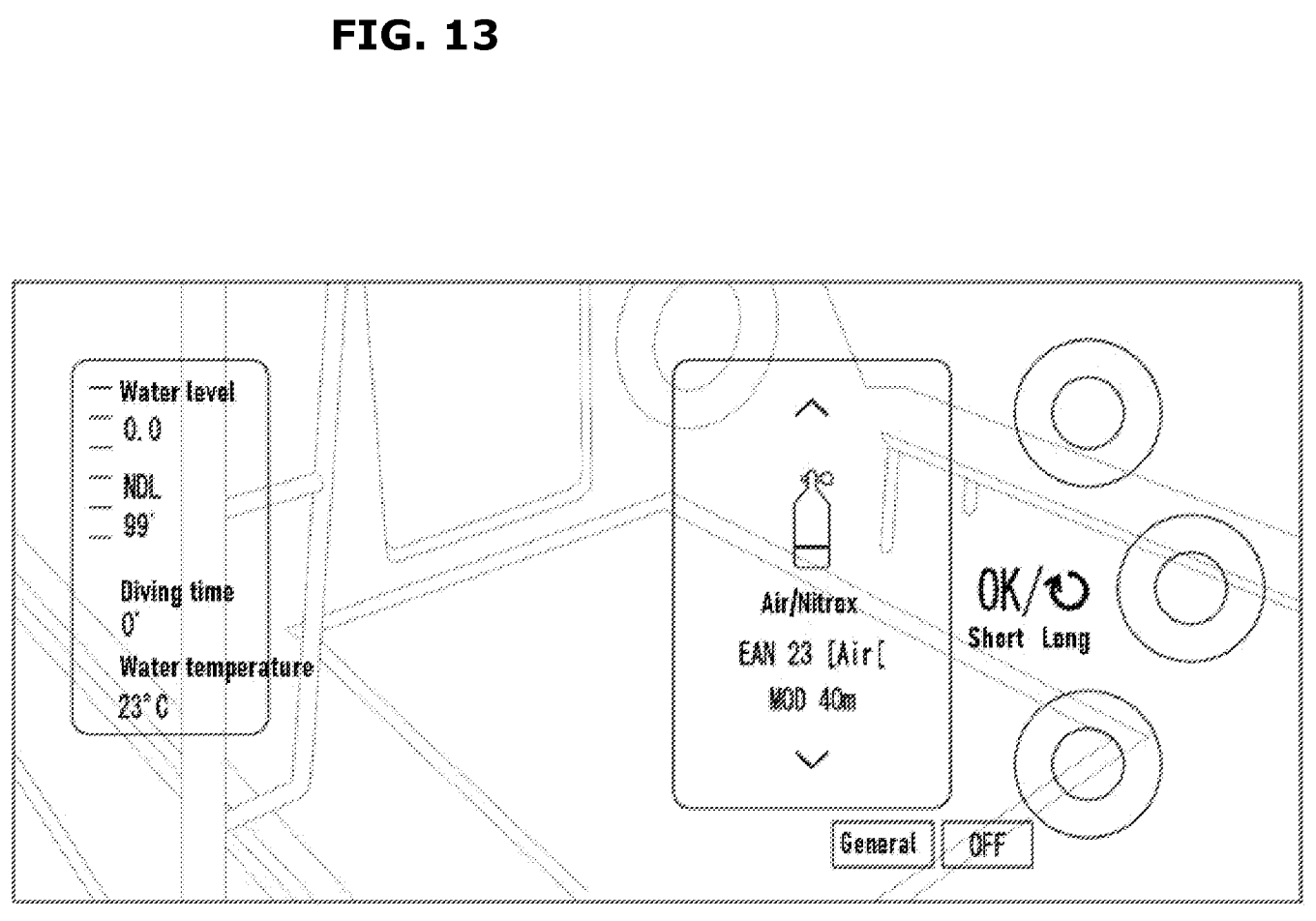

FIGS. 12 and 13 are exemplary views showing a screen changed to a diving mode.

Figure 14:
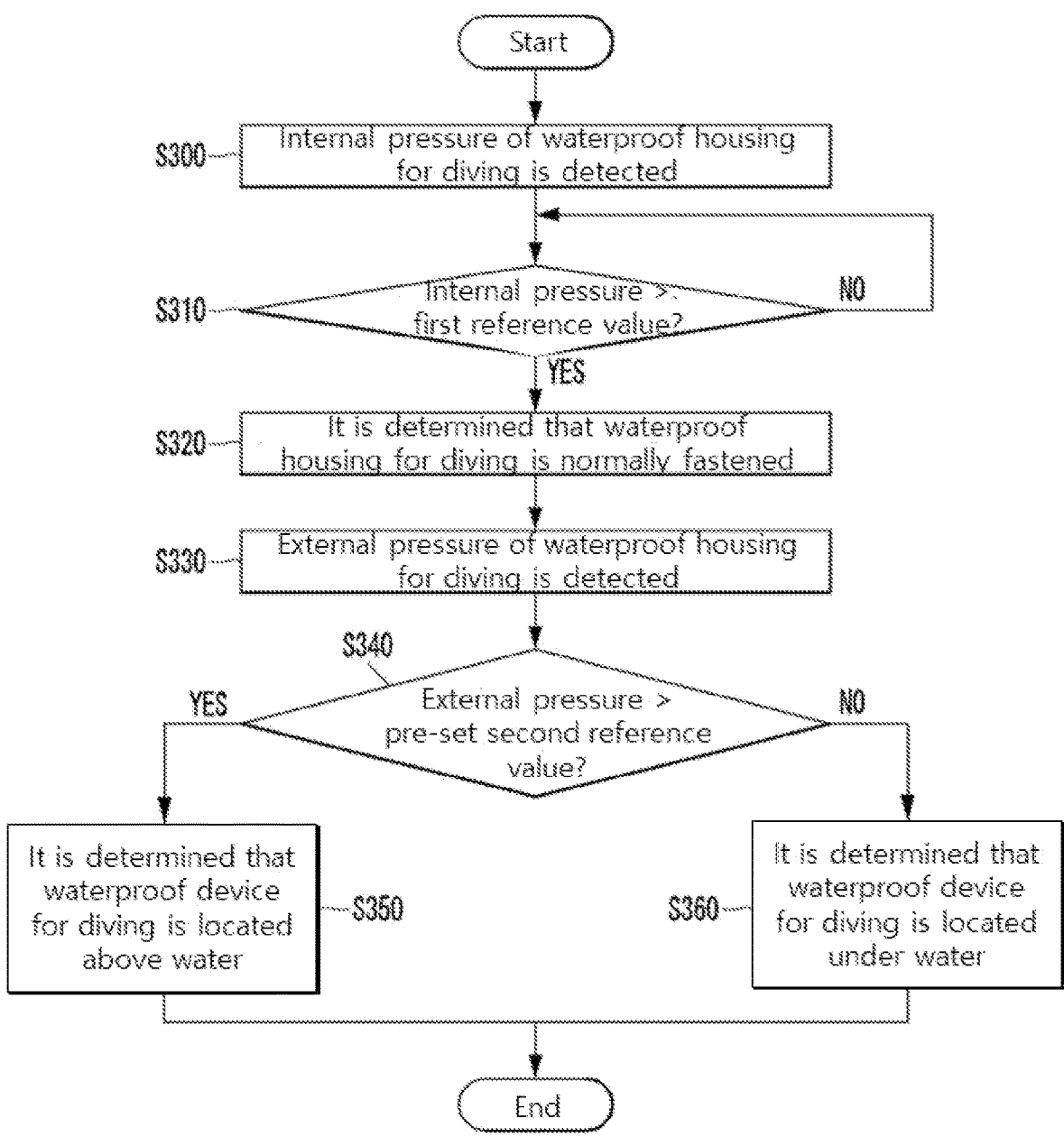

FIG. 14 is a flowchart showing a method for operating the waterproof device for diving according to another embodiment of the present invention.

Figure 15:
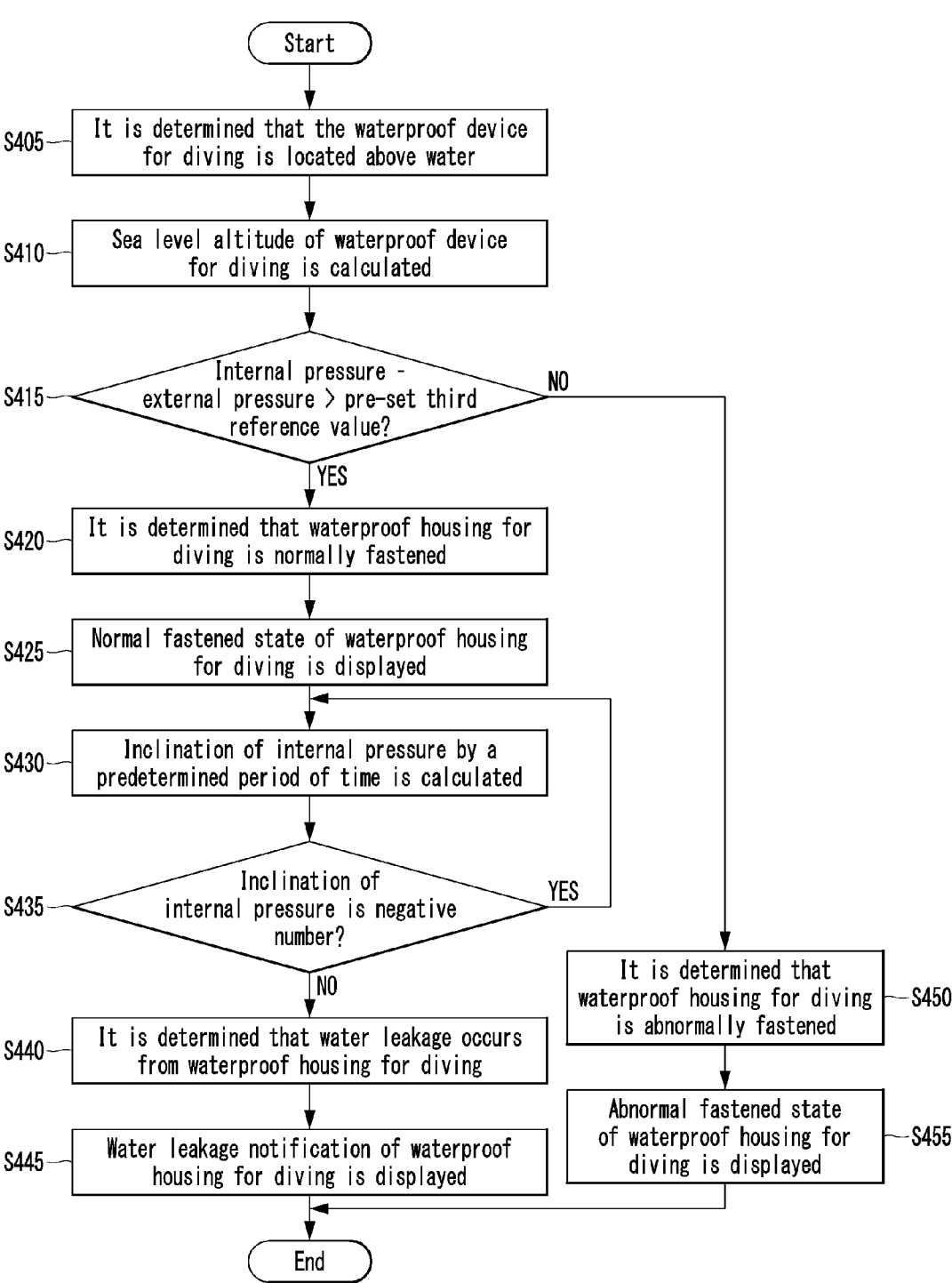

FIG. 15 is a flowchart showing a method for determining whether water leakage occurs in the case where the waterproof housing for diving is located above water according to the present invention.

Figure 16:
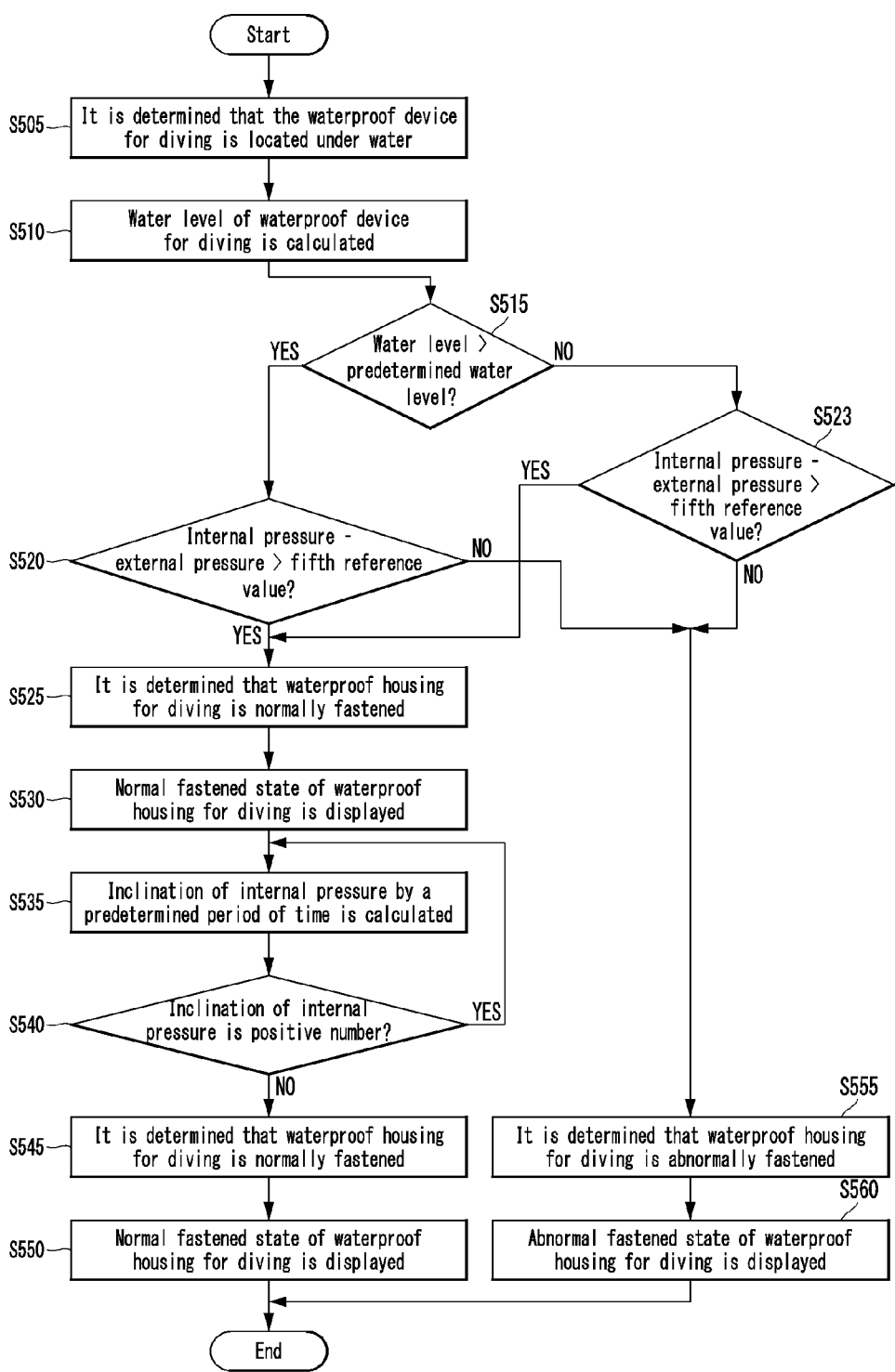

FIG. 16 is a flowchart showing a method for determining whether water leakage occurs in the case where the waterproof housing for diving is located under water according to the present invention.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure.

Terms used in the description will be explained briefly, and next, the present invention will be explained in detail.

In the description, the terms as will be discussed later are defined with general terms widely used at present in accordance with the functions of the present invention, but they may be varied under the intention or regulation of a user or operator. Further, some of terms may be arbitrarily defined by the applicant, which will be explained in detail in the description. Therefore, the terms used in the description should be defined on the basis of the whole scope of the present invention.

In the description, when it is said that one portion is described as "includes" any component, one element further may include other components unless no specific description is suggested. The term 'part', 'unit', and 'module', as used herein represent software or a hardware component such as field-programmable gate array (FPGA) or application specific integrated circuit (ASIC), and they serve to perform given functions. However, the term 'part', 'unit', and 'module' are not limited to the software or hardware component. The term 'part', 'unit', and 'module' may be configured to be in a storage medium addressable or to play one or more processors. Accordingly, for example, the term 'part', 'unit', and 'module' may include components such as software components, object-oriented software components, class components, and task components, processes, functions, attributes, procedures, sub-routines, segments of program codes, drivers, firmware, micro codes, circuits, data, database, data structures, tables, arrays, and variables.

Hereinafter, the present invention is disclosed with reference to the attached drawings. If it is determined that the detailed explanation on the well-known technology related to the present invention makes the scope of the present invention not clear, the explanation will be avoided for the brevity of the description.

Terms, such as the first, and the second, may be used to describe various elements, but the elements should not be restricted by the terms. The terms are used to only distinguish one element from the other element. For example, a first element may be named a second element without departing from the scope of the present invention. Likewise, a second element may be named a first element. A term 'and/or' includes a combination of a plurality of relevant and described items or any one of a plurality of related and described items.

Hereinafter, an explanation on a waterproof device for diving according to the present invention will be given in detail with reference to the attached drawings.

FIGS. 1 and 2 show a waterproof device for diving according to the present invention.

As shown in FIGS. 1 and 2, a waterproof device 1 for diving according to the present invention includes a waterproof housing 100 for diving, a waterproof auxiliary unit 200 for diving, and a mobile terminal 300.

The waterproof device 1 for diving serves to allow a user to take images and videos above water and under water, to store and display log records such as a water level, position, and diving records under water, and to perform guiding for the user's safety during diving.

In this case, the waterproof device 1 for diving determines whether the waterproof housing 100 for diving is normally fastened using the internal and external pressures detected by a first sensor part 320 of the mobile terminal 300 and a second sensor part 220 of the waterproof auxiliary unit 200 for diving and thus provides convenience functions above water and under water for the user through an application of the mobile terminal 300.

The mobile terminal 300 is fastened to the interior of the waterproof housing 100 for diving.

The mobile terminal 300 executes and controls a diving application and thus determines whether the waterproof housing 100 for diving is normally fastened thereto.

The mobile terminal 300 provides, for the user, an information pop-up having at least one of a pop-up for inducing Bluetooth connection and a preparation and caution information pop-up before diving, and a functional mode having at least one of a diving mode and a camera mode, on a display.

The mobile terminal 300 provides information of altitude, oxygen concentration, air temperature, water temperature, and the like for the user.

The mobile terminal 300 is a portable terminal that is accessed to a network wiredly or wirelessly, like a smartphone, to transmit and receive information and includes a barometer, an accelerometer, GPS, an inertial measurement unit, a temperature sensor, a humidity sensor, a proximity sensor, an ambient light sensor, and the like.

The waterproof housing 100 for diving serves to prevent external materials such as water, air, and the like from entering the mobile terminal 300, thereby protecting the mobile terminal 300 from such external materials.

FIGS. 3 and 4 show the waterproof housing for diving according to the present invention.

As shown in FIGS. 3 and 4, the waterproof housing 100 for diving includes an opening and closing member 110, input members 120, and a blocking member 130.

The waterproof housing 100 for diving is open and closed by means of the opening and closing member 110, and according to the present invention, the opening and closing member 110 is provided in the form of a hinge, so that the waterproof housing 100 for diving rotates around a longitudinal shaft of the opening and closing member 110 and is thus open and closed.

The waterproof housing 100 for diving has the plurality of input members 120 disposed on one side surface thereof, and in a state where the mobile terminal 300 is blocked from the outside under water, the waterproof housing 100 for diving transmits input signals to the mobile terminal 300 by means of the input members 120.

The input members 120 include a member for controlling a Bluetooth connection operation between the waterproof auxiliary unit 200 for diving and the mobile terminal 300 and a member for controlling operations of the application pre-built in the mobile terminal 300.

Further, the input members 120 include a member for notifying a diving start time point.

The input members 120 transmit the input signals to the display of the mobile terminal 300 by means of physical button touches and transmit the input signals to the mobile terminal 300 by means of wireless communication.

In a state where the waterproof housing 100 for diving is closed by means of the opening and closing member 110 after the mobile terminal 300 has been fastened to the waterproof housing 100 for diving, the waterproof housing 100 for diving prevents external materials such as water, air, and the like from entering the interior thereof by means of the blocking member 130.

According to the present invention, the blocking member 130 includes a sealing member 131 formed along the inner edges of the waterproof housing 100 for diving and a knob 132 for maintaining and reinforcing a blocking state of the waterproof housing 100 for diving when the waterproof housing 100 for diving is closed.

The waterproof auxiliary unit 200 for diving is fastened to the outer surface of the waterproof housing 100 for diving.

FIG. 5 shows an outer appearance of the waterproof auxiliary unit for diving according to the present invention.

As shown in FIG. 5, the waterproof auxiliary unit 200 for diving includes an input part 210 and transmits an input signal for diving start or an input signal for Bluetooth connection with the mobile terminal 300, which is generated from the input part 210, to the mobile terminal 300.

Further, the waterproof auxiliary unit 200 for diving serves to sense external environments of the waterproof housing 100 for diving.

Hereinafter, an explanation of the configuration of the waterproof device for diving according to the present invention will be given in detail with reference to the attached drawings.

FIG. 6 is a block diagram showing the configuration of the waterproof device for diving according to the present invention.

As shown in FIG. 6, the waterproof auxiliary unit 200 for diving and the mobile terminal 300 of the waterproof device 1 for diving are connected to each other by means of wireless communication.

The waterproof auxiliary unit 200 for diving includes the input part 210, the second sensor part 220, and a second communication part 230.

The input part 210 generates the input signal through the input of the user.

For example, if the user performs an input operation through a member such as a button above water or under water, the input part 210 generates the input signal corresponding to the user's input and thus transmits the input signal to the second communication part 230.

In the same manner as the input members 120, in specific, the input part 210 generates the input signal for controlling Bluetooth connection between the waterproof auxiliary unit 200 for diving and the mobile terminal 300, the input signal for controlling operations of the application pre-built in the mobile terminal 300, and the input signal for diving start.

The input part 210 has a physical button that can be used above water and under water.

In specific, if the user's input is received through the physical button, the input part 210 generates the input signal for diving start or the input signal for wireless connection between the waterproof auxiliary unit 200 for diving and the mobile terminal 300.

The second sensor part 220 detects the external pressure information of the waterproof housing 100 for diving and thus transmits the detected external pressure information to the second communication part 230.

In this case, the external pressure information includes atmospheric pressure and water pressure.

Further, the second sensor part 220 further detects sea level altitude information or water level information at a place where the waterproof device 1 for diving is currently located and external environment information of air temperature, water temperature, and oxygen concentration.

In specific, the second sensor part 220 transmits the detected external pressure information, sea level altitude information, water level information, and external environment information of air temperature, water temperature, and oxygen concentration to the second communication part 230.

The second communication part 230 transmits the input signal generated from the input part 210 and the external pressure information and external environment information detected by the second sensor part 220 to a first communication part 310 of the mobile terminal 300.

The second communication part 230 is connected to the first communication part 310 by means of wireless communication.

In specific, the second communication part 230 includes an antenna system, an RF transceiver, one or more amplifiers, a tuner, one or more oscillators, a digital signal processor, a CODEC chipset, a subscriber identify module (SIM) card, a memory, and the like, but it may include a well-known circuit for performing such functions, without being limited thereto.

Further, the second communication part 230 performs communication with the first communication part 310 of the mobile terminal 300 through an internet called World Wide Web (WWW), an intranet, a network, and/or a cellular network, a wireless network such as wireless LAN and/or Metropolitan Area Network (MAN), and wireless communication.

The wireless communication may include Global System for Mobile communication (GSM), Enhanced Data GSM Environment (EDGE), Wideband Code Division Multiple Access (WCDMA), Code Division Multiple Access (CDMA), Time Division Multiple Access (TDMA), Bluetooth, Bluetooth Low Energy (BLE), Near Field Communication (NFC), Zigbee, Wireless Fidelity (Wi-Fi) (e.g., IEEE802.11a, IEEE802.11b, IEEE802.11g and/or IEEE802.11n), Voice over Internet Protocol (VoIP), Wi-MAX, Wi-Fi Direct (WFD), Ultra-wideband (UWB), Infrared Data Association (IrDA), E-mail, instant messaging, and/or short message service (SMS) protocol or other appropriate communication protocol. Further, the wireless communication may include various wireless communication methods.

Further, the second communication part 230 makes use of at least one or more methods selected from the above-mentioned wireless communication methods.

The mobile terminal 300 includes the first communication part 310, the first sensor part 320, an I/O module 330, a memory 340, and a control unit 350.

The first communication part 310 receives the input signal, the external pressure information, and the external environment information from the second communication part 230 of the waterproof auxiliary unit 200 for diving and thus transmits the received information to the control unit 350.

The first communication part 310 includes an antenna system, an RF transceiver, one or more amplifiers, a tuner, one or more oscillators, a digital signal processor, a CODEC chipset, a subscriber identify module (SIM) card, a memory, and the like, but it may include a well-known circuit for performing such functions, without being limited thereto.

Further, the first communication part 310 performs communication with the second communication part 230 of the waterproof auxiliary unit 200 for diving through an internet called World Wide Web (WWW), an intranet, a network, and/or a cellular network, a wireless network such as wireless LAN and/or Metropolitan Area Network (MAN), and wireless communication.

The wireless communication may include Global System for Mobile communication (GSM), Enhanced Data GSM Environment (EDGE), Wideband Code Division Multiple Access (WCDMA), Code Division Multiple Access (CDMA), Time Division Multiple Access (TDMA), Bluetooth, Bluetooth Low Energy (BLE), Near Field Communication (NFC), Zigbee, Wireless Fidelity (Wi-Fi) (e.g., IEEE802.11a, IEEE802.11b, IEEE802.11g and/or IEEE802.11n), Voice over Internet Protocol (VoIP), Wi-MAX, Wi-Fi Direct (WFD), Ultra-wideband (UWB), Infrared Data Association (IrDA), E-mail, instant messaging, and/or short message service (SMS) protocol or other appropriate communication protocol. Further, the wireless communication may include various wireless communication methods.

Further, the first communication part 310 makes use of at least one or more methods selected from the above-mentioned wireless communication methods.

The first sensor part 320, which is included in the mobile terminal 300, detects the internal pressure of the waterproof housing 100 for diving or the detected data for the waterproof housing 100 for diving.

The first sensor part 320 includes a barometer, an accelerometer, GPS, an inertial measurement unit, a temperature sensor, a humidity sensor, a proximity sensor, an ambient light sensor, and the like.

The detected data includes the current position, direction, temperature, humidity, access of an outside object to the waterproof device 1 for diving, and the moving velocity, direction, distance, and movements of the user.

In specific, the first sensor part 320 detects the internal pressure of the waterproof housing 100 for diving and thus transmits the detected internal pressure to the control unit 350 through the first communication part 310.

The first sensor part 320 detects changes in the internal pressure for a predetermined intervals, and the control unit 350 receives the detected changes in the internal pressure in real time from the first sensor part 320 to thus determine whether the waterproof housing 100 for diving is normally fastened.

Further, the first sensor part 320 detects the movement of the user having the waterproof device 1 for diving.

The first sensor part 320 detects the user's moving velocity and direction using the accelerometer, converts the detected result into the user's movement, and thus senses the user's movement.

Further, the first sensor part 320 receives electric waves from a plurality of GPS satellites located in orbit around the earth and calculates the location and moving distance of the waterproof device 1 for diving using Time of Arrival (ToA) during which the waves from the GPS satellites reach the mobile terminal 300.

Furthermore, the first sensor part 320 calculates signal transmission and reception time between directional antennas of base stations and the mobile terminal 300 and thus obtains the location and moving distance of the waterproof device 1 for diving.

The first sensor part 320 instantly detects the location of the waterproof device 1 for diving through the calculated signal transmission and reception time and thus senses the user's movement using the signal transmission and reception time.

The first sensor part 320 measures the distances among the base stations and thus detects the location and moving distance of the waterproof device 1 for diving through triangulation.

Further, the first sensor part 320 measures the inertia of the waterproof device 1 for diving using the inertial measurement unit and detects the location and moving distance of the waterproof device 1 for diving and the movement of the user having the waterproof device 1 for diving through the measured inertia value.

Furthermore, the first sensor part 320 measures the temperature and humidity of a district where the waterproof device 1 for diving is currently located, the body temperature of the user, and the temperature of the waterproof device 1 for diving using the temperature sensor and the humidity sensor.

Additionally, the first sensor part 320 includes the proximity sensor for detecting whether the user accesses to the waterproof device 1 for diving and the ambient light sensor for detecting the amount of ambient light around the waterproof device 1 for diving, so that the first sensor part 320 generates the signals corresponding to the detection and thus transmits the generated signals to the control unit 350.

Sensors of the first sensor part 320 may be added or omitted in accordance with the performance of the mobile terminal 300.

The I/O module 330 displays at least one of the information pop-up and the functional mode.

The information pop-up includes at least one of the pop-up for inducing Bluetooth connection in response to the input signal and the preparation and caution information pop-up before diving, and the functional mode includes at least one of the diving mode and the camera mode.

The I/O module 330 displays at least one of the pop-up for inducing Bluetooth connection, the preparation and caution information pop-up before diving, the diving mode, and the camera mode.

The I/O module 330 controls a touchscreen and other input/output devices, and outputs of the devices and detects inputs.

In specific, the I/O module 330 includes a touchscreen, a graphic module, a contact module, and a motion module.

The touchscreen receives input signals from the user through haptic or tactile contacts. The touchscreen includes a touch sensing surface for receiving the input signals from the user. The touchscreen sensing surface detects the contacts with the touchscreen and interacts with a user interface subject such as at least one soft key for marking the detected contacts on the touchscreen. Further, a contact point between the touchscreen and the user corresponds to one or more user finger digits.

The touchscreen adopts technologies such as Light Emitting Diode (LED), Liquid Crystal Display (LCD), and Light emitting Polymer Display (LPD). Further, the touchscreen may adopt various display technologies.

The touchscreen detects contacts, movements, or stop using a plurality of touch sensing technologies such as capacitive touchscreen, resistive touchscreen, infrared touchscreen, and surface acoustic wave touchscreen, proximity sensor array, or other elements for determining contact points with the touchscreen.

Further, the user has a touch on the touchscreen using objects or accessories such as a stylus, a finger, and the like.

The graphic module allows texts, web pages, icons (e.g., user interface subjects including soft key), digital images, videos, animations, and all subjects to be displayed for the user to be displayed on the touchscreen. The graphic module includes various software for providing and displaying graphics on the touchscreen.

Further, the graphic module includes an optical intensity module. The optical intensity module serves to control the optical intensity of a graphic subject such as a user interface subject displayed on the touchscreen, and controlling the optical intensity of the optical intensity module represents increasing and decreasing the optical intensity of the graphic subject.

The contact module detects a contact with the touchscreen. The contact module transmits the detected contact with the touchscreen to the motion module.

The motion module detects the movement of a contact on the touchscreen. The motion module includes various software components for performing various operations related to the contact with the touchscreen, for example, determining whether a contact occurs, the contact is moved, the movement traversing the touchscreen is tracked, and the contact is stopped (if the contact is stopped). The determination as to whether the contact is moved includes the determination of the speed (size), velocity (size and direction), or acceleration (size and direction) of a contact point.

The memory 340 stores an operating system (OS) and a diving application and utilizes them in operating the waterproof device 1 for diving.

Further, the memory 340 stores diving log such as time, water level, diving time, location, temperature, etc., of the user who dives using the waterproof device 1 for diving.

The memory 340 includes non-volatile memory such as read-only memory (ROM), fast random access memory (RAM), magnetic disc storage medium, flash memory, or non-volatile semiconductor memory.

For example, the memory 340 as the semiconductor memory makes use of a Secure Digital (SD) memory card, Secure Digital High Capacity (SDHC) memory card, a mini SD memory card, a mini SDHC memory card, a Trans Flash (TF) memory card, a micro SD memory card, a micro SDHC memory card, a memory stick, a Compact Flash (CF), a Multi-Media Card (MMC), an MMC micro, an eXtreme Digital (XD) card, and the like.

Further, the memory 340 includes a network-attached storage medium accessed through a network.

The control unit 350 determines whether the waterproof housing 100 for diving is normally fastened using the internal pressure of the waterproof housing 100 for diving that is received from the first sensor part 320.

According to an embodiment of the present invention, if a difference between the internal pressure received from the first sensor part 320 after the waterproof housing 100 for diving has been closed and the basic internal pressure before the waterproof housing 100 for diving is closed is over reference internal pressure, the internal pressure of the waterproof housing 100 for diving is instantly drastically increased, so that the control unit 350 determines that the waterproof housing 100 for diving is normally fastened.

According to another embodiment of the present invention, if the internal pressure of the waterproof housing 100 for diving is over a first reference value, the control unit 350 determines that the waterproof housing 100 for diving is normally fastened, and contrarily, if the internal pressure of the waterproof housing 100 for diving is less than the first reference value, the control unit 350 determines that the waterproof housing 100 for diving is abnormally fastened.

Further, the control unit 350 receives the input signal generated from the input part 210 through the second communication part 230.

In a state where the mobile terminal 300 is mounted in the waterproof housing 100 for diving, if the control unit 350 receives the input signal for the Bluetooth connection with the mobile terminal 300 from the input part 210, the control unit 350 provides the Bluetooth connection inducing pop-up for the Bluetooth connection between the waterproof auxiliary unit 200 for diving and the mobile terminal 300 to allow pairing between the waterproof auxiliary unit 200 for diving and the mobile terminal 300.

If the connection setting of the mobile terminal 300 corresponds to the information pop-up, the control unit 350 displays the functional mode on the I/O module 330.

In this case, if a Bluetooth function and a flight mode of the mobile terminal 300 are turned on, the control unit 350 directly provides the diving mode pop-up to perform the conversion into the diving mode, without providing the Bluetooth connection inducing pop-up and the flight mode pop-up for the user.

Further, if at least one of the Bluetooth function and the flight mode of the mobile terminal 300 is not turned on, the control unit 350 displays the Bluetooth connection inducing pop-up and the flight mode pop-up on the I/O module 330 (touchscreen) to provide warning for the user.

If one of the input members 120 or the input part 210 is pushed by the user, the control unit 350 preforms the Bluetooth connection between the waterproof auxiliary unit 200 for diving and the mobile terminal 300.

If it is recognized that the waterproof auxiliary unit 200 for diving and the mobile terminal 300 are connected to each other, the control unit 350 executes the diving application stored in the memory 340 and displays GUI corresponding to the diving application on the I/O module 330.

The control unit 350 displays at least one of the preparation and caution information pop-up before diving and the diving mode on the I/O module 330 and provides notification for the user.

The control unit 350 determines whether the waterproof device 1 for diving is located above water or under water using the external pressure of the waterproof housing 100 for diving that is received from the second sensor part 220.

According to an embodiment of the present invention, the control unit 350 detects whether the external pressure of the waterproof housing 100 for diving that is measured with predetermined intervals is constantly decreased or increased and thus determines whether the waterproof device 1 for diving is located above water or under water.

If it is determined that the external pressure of the waterproof housing 100 for diving, which is detected by the second sensor part 220, is constantly decreased, the control unit 350 determines that the waterproof device 1 for diving is located above water, thereby displaying information of altitude, oxygen concentration, etc. on the I/O module 330 (touchscreen).

If it is determined that the external pressure of the waterproof housing 100 for diving, which is detected by the second sensor part 220, is constantly increased, the control unit 350 determines that the waterproof device 1 for diving is located under water, thereby displaying the pop-up for conversion into the diving mode on the I/O module 330 (touchscreen).

The diving mode includes the quantity of air remaining and the camera mode.

According to another embodiment of the present invention, if the external pressure of the waterproof housing 100 for diving that is measured by the second sensor part 220 is over a second reference value, the control unit 350 determines that the waterproof device 1 for diving is located above water, and contrarily, if the external pressure of the waterproof housing 100 for diving that is measured by the second sensor part 220 is less than the second reference value, the control unit 350 determines that the waterproof device 1 for diving is located under water.

In this case, the second reference value is a predetermined value by a manager, which means average atmospheric pressure on the sea level, for example, 1,018 hPa.

Further, if the control unit 350 receives the input signal for diving start from the input part 210, the control unit 350 allows diving time to be recorded in response to the received input signal.

According to an embodiment of the present invention, the control unit 350 receives the external pressure information from the second sensor part 220 and thus determines the environment of the waterproof device 1 for diving.

If it is determined that the waterproof device 1 for diving is located above water, the control unit 350 determines a sea level altitude, based on a lookup table.

If it is determined that the waterproof device 1 for diving is located under water, the control unit 350 determines a water level, based on a lookup table.

In determining the water level, if a 10 m water level is increased, it is assumed that 1,000 hPa is linearly increased.

Accordingly, the control unit 350 determines the water level corresponding to the difference value between the sensed external pressure and the second reference value is a water level at which the waterproof device 1 for diving is currently located.

According to another embodiment of the present invention, the control unit 350 receives the sea level altitude information or the water level information from the second sensor part 220.

If the external environment of the waterproof housing 100 for diving is determined, the control unit 350 receives the internal pressure of the waterproof housing 100 for diving from the first sensor part 320 and determines the fastened state of the waterproof housing 100 for diving under water.

For example, if it is determined that the waterproof device 1 for diving is currently located above water using the external pressure information received from the second sensor part 220, the control unit 350 determines whether a difference between the internal pressure value and the external pressure value for a predetermined interval is over a third reference value, based on the internal pressure information of the waterproof housing 100 for diving that is detected by the first sensor part 320.

If the difference between the internal pressure value and the external pressure value is over the third reference value, the control unit 350 determines that the fastened state of the waterproof housing 100 for diving is normal, and contrarily, if the difference between the internal pressure value and the external pressure value is less than the third reference value, the control unit 350 determines that the fastened state of the waterproof housing 100 for diving is abnormal.

In this case, the third reference value is predetermined by a manager and may be 90 hPa as a value that is obtained upon tests and product designs in consideration of changes in a difference between the internal pressure value increased by blocking the housing and keeping the blocked state and the external pressure.

Further, if it is determined that the waterproof device 1 for diving is currently located under water using the external pressure information received from the second sensor part 220, the control unit 350 determines whether the waterproof housing 100 for diving is normally fastened through a difference value between the internal pressure value and the external pressure value for a predetermined interval, based on the internal pressure information of the waterproof housing 100 for diving that is detected by the first sensor part 320.

For example, if a current water level of the waterproof housing 100 for diving is less than a predetermined water level value, the control unit 350 determines whether the difference between the internal pressure value and the external pressure value is over a fourth reference value.

If the difference between the internal pressure value and the external pressure value is over the fourth reference value, the control unit 350 determines that the fastened state of the waterproof housing 100 for diving is normal, and contrarily, if the difference between the internal pressure value and the external pressure value is less than the fourth reference value, the control unit 350 determines that the fastened state of the waterproof housing 100 for diving is abnormal.

In this case, the fourth reference value is predetermined by the manager and may be 80 hPa as a value that is obtained upon tests and product designs in consideration of changes in a difference between the internal pressure value increased by blocking the housing and keeping the blocked state and the external pressure.

Further, if a current water level of the waterproof housing 100 for diving is over the predetermined water level value, the control unit 350 determines whether the difference between the internal pressure value and the external pressure value is over a fifth reference value.

If the difference between the internal pressure value and the external pressure value is over the fifth reference value, the control unit 350 determines that the fastened state of the waterproof housing 100 for diving is normal, and contrarily, if the difference between the internal pressure value and the external pressure value is less than the fifth reference value, the control unit 350 determines that the fastened state of the waterproof housing 100 for diving is abnormal.

In this case, the fifth reference value is predetermined by the manager and may be 40 hPa as a value that is obtained upon tests and product designs in consideration of changes in a difference between the internal pressure value increased by blocking the housing and keeping the blocked state and the external pressure, and the predetermined water level value is 10 m as a value that is obtained upon tests and product designs in consideration of the pressure under water and the internal pressure of the housing.

If it is determined that the fastened state of the waterproof housing 100 for diving is normal, the control unit 350 determines whether water leakage occurs from the waterproof housing 100 for diving at predetermined intervals.

In specific, if it is determined that the fastened state of the waterproof housing 100 for diving is normal and the waterproof device 1 for diving is currently located above water using the external pressure information received from the second sensor part 220, the control unit 350 monitors an inclination (WL) of the internal pressure at predetermined intervals based on the internal pressure information of the first sensor part 320.

The control unit 350 monitors inclinations of the internal pressure with the predetermined number of times of sampling for the predetermined intervals.

If the inclinations of the internal pressure by the monitored sampling time are all negative (−) numbers, the control unit 350 determines that water leakage occurs from the interior of the waterproof housing 100 for diving.

Further, if it is determined that the fastened state of the waterproof housing 100 for diving is normal and the waterproof device 1 for diving is located under water using the external pressure information received from the second sensor part 220, the control unit 350 monitors an inclination (WL) of the internal pressure at predetermined intervals based on the internal pressure information of the first sensor part 320.

The control unit 350 monitors the inclinations of the internal pressure with the predetermined number of sampling times for the predetermined intervals.

If the inclinations of the internal pressure by the monitored sampling time are all positive (+) numbers, the control unit 350 determines that water leakage occurs from the interior of the waterproof housing 100 for diving.

According to an embodiment of the present invention, the control unit 350 calculates the inclination of the internal pressure, based on changes in the internal pressure of start and end points of the predetermined intervals.

According to the embodiment of the present invention, the inclination (WL) of the internal pressure is calculated by the following mathematical expression 1.

$$WL = \frac{P_{ie} - P_{is}}{t_e - t_s} \qquad \text{[Mathematical expression 1]}$$

(wherein $t_e$ represents an end time point of the predetermined intervals, $t_s$ a start time point of the predetermined intervals, $P_{ie}$ the internal pressure at the end time point, and $P_{is}$ the internal pressure at the start time point).

According to another embodiment of the present invention, the control unit 350 calculates the inclination of the internal pressure as the mean of the inclinations calculated based on the predetermined number of sampling times for each point of the predetermined intervals.

According to another embodiment of the present invention, the inclination (WL) of the internal pressure is calculated by the following mathematical expression 2.

$$WL = \frac{\sum\limits_{K=1}^{N} \frac{P_{ik+1} - P_{ik}}{t_{k+1} - t_k}}{N} \qquad \text{[Mathematical expression 2]}$$

(wherein N represents the predetermined number of sampling times, $t_k$ a sampling time point, and $P_{ik}$ the internal pressure at the sampling time point).

According to yet another embodiment of the present invention, the control unit 350 calculates the inclinations of the internal pressure at continuous time points for a predetermined intervals and monitors the change of the inclinations.

According to yet another embodiment of the present invention, the inclination (WL) of the internal pressure is calculated by the following mathematical expression 3.

$$WL(t) = \frac{dP_i(t)}{dt} \qquad \text{[Mathematical expression 3]}$$

(wherein t represents a calculated time point and $dP_i(t)$ the internal pressure at the calculated time point).

Further, according to an embodiment of the present invention, the control unit 350 determines whether the fastened state of the waterproof housing 100 for diving is released using the detected internal pressure of the waterproof housing 100 for diving and the pre-stored basic internal pressure.

In this case, the control unit 350 determines whether the detected internal pressure is in an error range of the pre-stored basic internal pressure.

If it is determined that the detected internal pressure is in an error range of the pre-stored basic internal pressure, the control unit 350 recognizes that the user finishes diving and thus releases the fastened state of the waterproof housing 100 for diving, releases the diving mode, and performs the conversion into a home screen.

In this case, the error range is the range of $= 10\%$ of the basic internal pressure, but it may be changed by the manager, without being limited thereto.

According to another embodiment of the present invention, the control unit 350 determines whether the waterproof device 1 for diving is currently located above water using the external pressure, releases the diving mode, and performs the conversion into the home screen.

In this case, if it is determined that the waterproof device 1 for diving is located under water before given time and the waterproof device 1 for diving is currently located above water after given time has passed, the control unit 350 recognizes that the user finishes diving and thus releases the diving mode.

According to yet another embodiment of the present invention, the control unit 350 releases the diving mode in consideration of the inclination of the internal pressure change and performs the conversion into the home screen.

In this case, the control unit 350 determines that the water level is decreased or the waterproof device 1 for diving is located above water, and if the inclination of the internal pressure change is changed from a positive number into a negative number, the control unit 350 recognizes that the user finishes diving and thus releases the diving mode.

For example, it is assumed that the basic internal pressure is 1019 hPa, the internal pressure when the waterproof housing 100 for diving is normally fastened is 1113 hPa, the internal pressure in the case of 1 bar (a 10 m water level) is 1200 hPa, the internal pressure in the case of 2 bars (a 20 m water level) is 1246 hPa, and the internal pressure in the case of 3 bars (a 30 m water level) is 1292 hPa.

If the user dives into water, the internal pressure (1113 hPa) when the waterproof housing 100 for diving is normally fastened is increased to the internal pressure (1292 hPa) in the case of 3 bars.

Accordingly, the inclination of the internal pressure change becomes a positive number.

Contrarily, if the user located underwater comes up to the surface of water to finish the diving, the internal pressure is decreased so that the inclination of the internal pressure change becomes a negative number.

The control unit 350 detects the inclination of the internal pressure change and thus releases the diving mode.

In specific, the control unit 350 recognizes that the user finishes the diving in consideration of at least one of the error range of the internal pressure, the external pressure, and the inclination of the internal pressure change, releases the diving mode, and performs the conversion into the home screen.

Further, the control unit 350 determines whether a normal fastened state determination is performed, and based on pre-stored models of mobile terminals covered by insurance, thus checks whether the mobile terminal 300 possessed by the user can be covered by the insurance.

Further, if water leakage occurs, the control unit 350 transmits the water leakage occurrence to a customer center server located at the outside.

For example, the control unit 350 transmits a phrase 'leakage problem' to the customer center server.

The control unit 350 receives a solution from the customer center server.

Based on the external pressure information of the second sensor part 220 and the internal pressure information of the first sensor part 320, the control unit 350 allows the current position (under water or above water), water level, and sea level altitude of the waterproof device 1 for diving, the normal or abnormal fastened state of the waterproof housing 100 for diving, and the water leakage state of the waterproof housing 100 for diving after the determination of the normal fastened state to be displayed on the I/O module 330 (touchscreen) through the diving application stored in the memory 340.

The control unit 350 functions as a central processing unit called a microprocessor, and the microprocessor is a computer processor where the arithmetic logical unit, register, program counter, command decoder and control circuit are arranged on at least one silicon chip.

Further, the microprocessor includes a Graphic Processing Unit (GPU) for performing graphic processing of images or videos. The microprocessor may have a system on a chip (SoC) including a core and GPU. The microprocessor may be single-core, dual-core, triple-core, quad-core, and octa-core processors.

Furthermore, the control unit 350 includes a graphic processing board having GPU, RAM or ROM mounted on a separate printed circuit board connected electrically with the microprocessor.

Hereinafter, a method for determining whether the waterproof device 1 for diving according to the present invention is normally fastened will be explained with reference to the attached drawings.

FIG. 7 is a flowchart showing a method for determining whether the waterproof device for diving according to the present invention is normally fastened.

The mobile terminal 300 is coupled to the waterproof housing 100 for diving, and next, the opening and closing member 110 is closed to prevent impurities from entering the waterproof housing 100 for diving (at step S100).

In this case, the basic internal pressure of the waterproof housing 100 for diving is detected by the first sensor part 320 before the opening and closing member 110 is closed, and after the opening and closing member 110 has been closed, the internal pressure of the waterproof housing 100 for diving is in real time detected by the first sensor part 320.

The control unit 350 detects whether a difference value between the basic internal pressure and the measured internal pressure detected by the first sensor part 320 after the opening and closing member 110 has been closed is over a reference internal pressure (at step S110) and thus determines whether the waterproof housing 100 for diving is normally fastened or not.

If the difference value between the basic internal pressure and the measured internal pressure is over the reference internal pressure (YES at the step S110), the control unit 350 determines that the waterproof housing 100 for diving is normally fastened (at step S120).

In this case, the basic internal pressure is 1,018 hPa, and the reference internal pressure is 1,100 hPa. However, they may be varied according to a model of the mobile terminal 300, without being limited thereto.

Contrarily, if the difference value between the basic internal pressure and the measured internal pressure is less than the reference internal pressure (NO at the step S110), the control unit 350 provides a pop-up for refastening of the waterproof housing 100 for diving for the user through the mobile terminal 300.

That is, if the internal pressure of the fastened waterproof housing 100 for diving becomes close to the basic internal pressure, the control unit 350 determines that the waterproof housing 100 for diving is abnormally fastened.

FIG. 8 is an exemplary view showing a water leakage test.

As shown in FIG. 8, the control unit 350 determines whether the waterproof housing 100 for diving is normally fastened and thus performs a water leakage test.

If it is determined that that the waterproof housing 100 for diving is normally fastened, the control unit 350 provides at least one of the information pop-up for diving and the functional mode.

According to an embodiment of the present invention, the control unit 350 provides the Bluetooth connection inducing pop-up between the waterproof auxiliary unit 200 for diving and the mobile terminal 300 on the display of the mobile terminal 300 (at step S130).

In this case, the control unit 350 may provide a flight mode pop-up on the display of the mobile terminal 300.

In this case, the control unit 350 determines whether Bluetooth of the mobile terminal 300 has pairing with the waterproof device 1 for diving.

If the connection setting of the mobile terminal 300 corresponds to the information pop-up, the control unit 350 displays the functional mode.

If the mobile terminal 300 and the waterproof device 1 for diving are pre-paired with Bluetooth and the flight mode of the mobile terminal 300 is turned on, the control unit 350 immediately performs the conversion into the diving mode, without providing the Bluetooth connection inducing pop-up and the flight mode pop-up.

Further, if the mobile terminal 300 and the waterproof device 1 for diving are not pre-paired with Bluetooth and the flight mode of the mobile terminal 300 is not turned on, the control unit 350 displays the Bluetooth connection inducing pop-up and the flight mode pop-up on the I/O module 330.

FIGS. 9 and 10 are exemplary views showing the Bluetooth connection inducing pop-up.

According to an embodiment of the present invention, as shown in FIG. 9, a pop-up "Please turn on Bluetooth" is provided on the display screen of the mobile terminal 300 under the control of the control unit 350.

If one of the input members 120 or the input part 210, which is formed of a physical button, is pushed by the user, the input part 210 generates the input signal for Bluetooth connection between the waterproof auxiliary unit 200 for diving and the mobile terminal 300, and the control unit 350 receives the input signal to allow the waterproof auxiliary unit 200 for diving and the mobile terminal 300 to be paired.

If the waterproof auxiliary unit 200 for diving and the mobile terminal 300 have Bluetooth connection, as shown in FIG. 10, the control unit 350 provides a pop-up "Please turn on flight mode" on the display screen of the mobile terminal 300 and performs the step of preparing diving.

In a state where the Bluetooth connection is completed, the control unit 350 determines whether diving starts according to the user's input (at step S140).

According to an embodiment of the present invention, the control unit 350 provides a pop-up "Do you start diving?" on the display screen of the mobile terminal 300.

Next, an input button is generated on the display screen of the mobile terminal 300, and the user selects "Yes" or "No" through a physical button or touchscreen.

If "No" is selected by the user (NO at the step S140), the control unit 350 converts the display screen of the mobile terminal 300 into the home screen (at step S160).

If "Yes" is selected by the user (YES at the step S140), the control unit 350 provides a preparation and caution information pop-up before diving and converts the display of the mobile terminal 300 into the diving mode (at step S150).

In this case, the control unit 350 controls the I/O module 330 of the mobile terminal 300 to allow at least one of the diving mode for diving start and the camera mode to be converted into the functional mode.

In this case, the control unit 350 displays the amount of air remaining and the camera mode with at least one of wide-angle, general, zoom, selfie modes on the display screen of the mobile terminal 300.

The camera mode is included in the diving mode and thus displayed.

The functional mode may be converted into a hiking mode, a swimming mode, and the like according to use purposes of the waterproof device 1 for diving.

In the above-mentioned method, the user checks whether the waterproof device 1 for diving is normally fastened before diving and thus prepares diving.

Hereinafter, an explanation of the operations of the waterproof device 1 for diving after sports such as diving or hiking have started will be given with reference to the attached drawings.

FIG. 11 is a flowchart showing a method for operating the waterproof device for diving according to an embodiment of the present invention.

If the user dives or goes hiking using the waterproof device 1 for diving, the external pressure of the waterproof device 1 for diving, which is detected at predetermined intervals, is in real time detected by the second sensor part 220 (at step S200).

The control unit 350 receives the detected external pressure through the second communication part 230.

The control unit 350 determines whether the detected external pressure is constantly decreased or increased (at step S210).

Accordingly, the control unit 350 determines whether the waterproof device 1 for diving is currently located above water or under water according to the determination as to whether detected external pressure is constantly decreased or increased.

If it is determined that the detected external pressure is constantly decreased (in the case of being decreased at the step S210), the control unit 350 determines that the waterproof device 1 for diving is currently located above water (at step S220).

In this case, the waterproof device 1 for diving is possessed by the user, and accordingly, the location of the user can be recognized by the location of the waterproof device 1 for diving.

If it is determined that the waterproof device 1 for diving is currently located above water, the control unit 350 provides the external environment information of altitude, oxygen concentration, etc. for the user through the mobile terminal 300.

Contrarily, if it is determined that the detected external pressure is constantly increased (in the case of being increased at the step S210), the control unit 350 determines that the waterproof device 1 for diving is currently located under water (at step S240).

The control unit 350 converts the screen of the mobile terminal 300 into the functional mode for diving under water (at step S250).

According to an embodiment of the present invention, the control unit 350 converts the screen of the mobile terminal 300 into the camera mode in which the user takes images under water.

FIGS. 12 and 13 are exemplary views showing a screen changed into the diving mode.

As shown in FIGS. 12 and 13, the control unit 350 provides the camera mode in which the user can take images, while diving, and provides the amount of air remaining in an air tank.

In this case, the control unit 350 displays the wide-angle mode, the general mode, the zoom mode, and the selfie mode through the I/O module 330 of the mobile terminal 300.

If the conversion into the diving mode is performed, the external pressure and internal pressure of the waterproof device 1 for diving are automatically measured by the second sensor part 220 and the first sensor part 320 (at step S260).

The control unit 350 determines whether the waterproof housing 100 for diving is normally fastened through the external pressure and internal pressure of the waterproof device 1 for diving that are received from the second sensor part 220 and the first sensor part 320 (at step S270).

In this case, a method for determining whether water leakage occurs or not after determining whether the waterproof housing 100 for diving is normally fastened through the external pressure and internal pressure will be explained in detail later with reference to FIGS. 15 and 16.

Further, as shown in FIG. 8, the control unit 350 determines whether the waterproof housing 100 for diving is normally fastened through the water leakage test.

If it is determined that the waterproof housing 100 for diving is abnormally fastened (NO at the step S270), the control unit 350 provides water leakage probability for the user through the screen of the mobile terminal 300 (at step S280).

Contrarily, if it is determined that the waterproof housing 100 for diving is normally fastened (YES at the step S270), the control unit 350 determines that no water leakage probability exists.

Next, if the user finishes the diving to release the fastened state of the waterproof housing 100 for diving, the control unit 350 automatically converts the screen of the mobile terminal 300 into the home screen.

In the above-mentioned method, it is determined whether the waterproof device 1 for diving according to the present invention is located above water or under water, and according to the determination, the waterproof device 1 for diving operates.

Hereinafter, methods for determining whether the waterproof housing 100 for diving is normally fastened and whether the waterproof device 1 for diving is located above water or under water according to another embodiment of the present invention will be explained with reference to the attached drawings.

FIG. 14 is a flowchart showing a method for operating the waterproof device for diving according to another embodiment of the present invention.

The internal pressure of the waterproof housing 100 for diving is detected by the first sensor part 320 (at step S300).

The control unit 350 compares the detected internal pressure with a first reference value (at step S310) to determine whether the waterproof housing 100 for diving is normally fastened or not.

If the internal pressure of the waterproof housing 100 for diving is over the first reference value (YES at the step S310), the control unit 350 determines that the waterproof housing 100 for diving is normally fastened (at step S320), and contrarily, if the internal pressure of the waterproof housing 100 for diving is less than the first reference value (NO at the step S310), the control unit 350 determines that the waterproof housing 100 for diving is abnormally fastened.

If it is determined that the waterproof housing 100 for diving is abnormally fastened, the control unit 350 provides a re-fastening request pop-up for the user through the I/O module 330.

If it is determined that the waterproof housing 100 for diving is normally fastened, the control unit 350 displays the Bluetooth connection inducing pop-up for the pairing between the waterproof auxiliary unit 200 for diving and the mobile terminal 300 on the mobile terminal 300.

If the input part 210 formed of a physical button on the waterproof auxiliary unit 200 for diving is pushed by the user, the input part 210 generates the input signal for Bluetooth connection between the waterproof auxiliary unit 200 for diving and the mobile terminal 300.

If the control unit 350 receives the input signal, Bluetooth connection is performed between the waterproof auxiliary unit 200 for diving and the mobile terminal 300, and the control unit 350 executes the diving application stored in the memory 340 according to the received input signal.

In this case, the processes of connecting Bluetooth and executing the diving application have been already explained with reference to FIG. 7, and therefore, an explanation of the processes will be avoided.

The second sensor part 220 detects the external pressure of the waterproof housing 100 for diving at predetermined intervals (at step S330).

The control unit 350 compares the detected external pressure with a second reference value to determine whether the waterproof device 1 for diving is located above water or under water (at step S340).

In this case, if the detected external pressure is over the second reference value (YES at the step S340), the control unit 350 determines that the waterproof device 1 for diving is located above water (at step S350).

Contrarily, if the detected external pressure is less than the second reference value (NO at the step S340), the control unit 350 determines that the waterproof device 1 for diving is located under water (at step S360).

In the above-mentioned method, it is checked whether the waterproof housing 100 for diving is normally fastened and it is then determined that the waterproof device 1 for diving is located above water or under water.

Hereinafter, a method for determining whether water leakage occurs from the waterproof housing for diving according to the present invention will be explained with reference to the attached drawings.

FIG. 15 is a flowchart showing a method for determining whether water leakage occurs in the case where the waterproof housing for diving is located above water according to the present invention.

If it is determined that the waterproof device 1 for diving is located above water (at step S405), the control unit 350 calculates the sea level altitude of the waterproof device 1 for diving (at step S410).

In this case, the step S410 has been already explained when the second sensor part 220 is described, and therefore, a detailed explanation of the step S410 will be omitted.

The control unit 350 determines whether the waterproof housing 100 for diving is normally fastened using the internal pressure and external pressure detected at the predetermined intervals (at step S415).

The control unit 350 determines whether a difference value between the internal pressure and the external pressure is over a third reference value.

If the difference value between the internal pressure and the external pressure is over the third reference value (YES at the step S415), the control unit 350 determines that the waterproof housing 100 for diving is normally fastened (at step S420).

Next, the control unit 350 displays the normal fastened state of the waterproof housing 100 for diving on the diving application of the touchscreen of the mobile terminal 300 (at step S425).

If it is determined that the waterproof housing 100 for diving is normally fastened, the control unit 350 calculates the inclination of the internal pressure of the waterproof housing 100 for diving at predetermined intervals (at step S430).

Next, the control unit 350 determines whether water leakage occurs from the waterproof housing 100 for diving, based on the calculated inclination of the internal pressure of the waterproof housing 100 for diving.

In this case, the control unit 350 determines whether the calculated inclination of the internal pressure is a negative number (at step S435).

If the calculated inclination of the internal pressure is the negative number (YES at the step S435), the control unit 350 determines that the water leakage does not occur and then performs the process of calculating the inclination of the internal pressure at predetermined intervals again.

In this case, the control unit 350 repeatedly performs the process of calculating the inclination of the internal pressure at predetermined intervals to monitor whether the water leakage occurs from the waterproof housing 100 for diving.

If the calculated inclination of the internal pressure is not a negative number (NO at step S435), the control unit 350 determines that the water leakage occurs (at step S440).

Next, the control unit 350 displays the water leakage occurrence of the waterproof housing 100 for diving on the diving application of the touchscreen of the mobile terminal 300 (at step S445).

Contrarily, if it is determined that the difference value between the internal pressure and the external pressure is less than the third reference value (NO at the step S415), the control unit 350 determines that the waterproof housing 100 for diving is abnormally fastened (at step S450).

Next, the control unit 350 displays the abnormal fastened state of the waterproof housing 100 for diving on the diving application of the touchscreen of the mobile terminal 300 (at step S455).

In this case, the steps S400 to S455 are performed in the same manner as the steps S220 to S280 of FIG. 11.

FIG. 16 is a flowchart showing a method for determining whether water leakage occurs in the case where the waterproof housing for diving is located under water according to the present invention.

If it is determined that the waterproof device 1 for diving is located under water (at step S505), the control unit 350 calculates the water level of the waterproof device 1 for diving (at step S510).

In this case, the control unit 350 calculates the water level of the waterproof device 1 for diving in consideration of the external pressure.

In this case, the step S510 has been already explained when the second sensor part 220 or the control unit 350 is described, and therefore, a detailed explanation of the step S510 will be omitted.

The control unit 350 determines whether the calculated water level is over a predetermined water level.

If the current water level of the waterproof housing 100 for diving is over the predetermined water level (YES at the step S515), the control unit 350 determines whether the calculated difference value between the external pressure and the internal pressure is over a fourth reference value (at step S520).

In this case, the control unit 350 receives the internal pressure detected by the first sensor part 320 and the external pressure detected by the second sensor part 220.

If it is determined that the difference value between the external pressure and the internal pressure is over the fourth reference value (YES at the step S520), the control unit 350 determines that the waterproof housing 100 for diving is normally fastened (at step S525).

Next, the control unit 350 displays the normal fastened state of the waterproof housing 100 for diving on the diving application of the touchscreen of the mobile terminal 300 (at step S530).

If it is determined that the waterproof housing 100 for diving is normally fastened, the control unit 350 calculates the inclination of the internal pressure of the waterproof housing 100 for diving at predetermined intervals (at step S535).

Next, the control unit 350 determines whether water leakage occurs from the waterproof housing 100 for diving, based on the calculated inclination of the internal pressure of the waterproof housing 100 for diving.

In this case, the control unit 350 determines whether the calculated inclination of the internal pressure is a positive number (at step S540).

In this case, the control unit 350 determines whether water leakage occurs according to the determination as to whether the calculated inclination of the internal pressure is a positive number.

If the calculated inclination of the internal pressure is the positive number (YES at the step S540), the control unit 350 determines that the water leakage does not occur and then performs the process of calculating the inclination of the internal pressure at the predetermined intervals again.

In this case, the control unit 350 repeatedly performs the process of calculating the inclination of the internal pressure at the predetermined intervals to monitor whether the water leakage occurs from the waterproof housing 100 for diving.

If the calculated inclination of the internal pressure is not a positive number (NO at the step S540), the control unit 350 determines that the water leakage occurs from the waterproof housing 100 for diving (at step S545).

Next, the control unit 350 displays the water leakage occurrence of the waterproof housing 100 for diving on the diving application of the touchscreen of the mobile terminal 300 (at step S550).

Contrarily, if it is determined that the difference value between the internal pressure and the external pressure is less than the fourth reference value (NO at the step S520), the control unit 350 determines that the waterproof housing 100 for diving is abnormally fastened (at step S555).

Next, the control unit 350 displays the abnormal fastened state of the waterproof housing 100 for diving on the diving application of the touchscreen of the mobile terminal 300 (at step S560).

If the current water level of the waterproof housing 100 for diving is less than the predetermined water level (NO at the step S515), the control unit 350 determines whether the calculated difference value between the external pressure and the internal pressure is over a fifth reference value (at step S523).

If it is determined that the difference value between the external pressure and the internal pressure is over the fifth reference value (YES at the step S523), the control unit 350 determines that the waterproof housing 100 for diving is normally fastened (at the step S525).

Next, the control unit 350 displays the normal fastened state of the waterproof housing 100 for diving on the diving application of the touchscreen of the mobile terminal 300 (at the step S530).

If it is determined that the waterproof housing 100 for diving is normally fastened, the control unit 350 calculates the inclination of the internal pressure of the waterproof housing 100 for diving at predetermined intervals (at the step S535).

Next, the control unit 350 determines whether water leakage occurs from the waterproof housing 100 for diving, based on the calculated inclination of the internal pressure of the waterproof housing 100 for diving.

In this case, the control unit 350 determines whether the calculated inclination of the internal pressure is a positive number (at the step S540).

In this case, the control unit 350 determines whether water leakage occurs according to the determination as to whether the calculated inclination of the internal pressure is a positive number.

If the calculated inclination of the internal pressure is the positive number (YES at the step S540), the control unit 350 determines that the water leakage does not occur and then performs the process of calculating the inclination of the internal pressure at predetermined intervals again.

In this case, the control unit 350 repeatedly performs the process of calculating the inclination of the internal pressure at predetermined intervals to monitor whether the water leakage occurs from the waterproof housing 100 for diving.

If the calculated inclination of the internal pressure is not a positive number (NO at the step S540), the control unit 350 determines that the water leakage occurs from the waterproof housing 100 for diving (at the step S545).

Next, the control unit 350 displays the water leakage occurrence of the waterproof housing 100 for diving on the diving application of the touchscreen of the mobile terminal 300 (at the step S550).

Contrarily, if it is determined that the difference value between the internal pressure and the external pressure is less than the fifth reference value (NO at the step S523), the control unit 350 determines that the waterproof housing 100 for diving is abnormally fastened (at the step S555).

Next, the control unit 350 displays the abnormal fastened state of the waterproof housing 100 for diving on the diving application of the touchscreen of the mobile terminal 300 (at the step S560).

In this case, the steps S500 to S560 are performed in the same manner as the steps S220 to S280 of FIG. 11.

Although specific embodiments have been illustrated and described herein, it will be appreciated by those of ordinary skill in the art that any arrangement, which is calculated to achieve the same purpose, may be substituted for the specific embodiment shown. Accordingly, the present subject matter is not limited to the embodiments described above or depicted in the drawings, and various embodiments and modifications can be made without departing from the scope of the claims below. Therefore, it is manifestly intended that this invention be limited only by the claims and the equivalents thereof.

What is claimed is:

1. A waterproof device for diving comprising:
   a mobile terminal; and
   an openable and closable waterproof housing adapted to detachably mount the mobile terminal,
   wherein the mobile terminal comprises:
   a touchscreen for displaying at least one of an information pop-up and a functional mode;
   a first pressure sensor for detecting internal pressure of the waterproof housing; and
   a processor configured to determine whether the waterproof housing is normally fastened using the detected internal pressure,
   wherein the processor is configured to calculate an inclination of the internal pressure at predetermined intervals and determine whether water leakage occurs from the waterproof housing based on the calculated inclination of the internal pressure.

2. The waterproof device for diving according to claim 1, wherein when it is determined through the processor that the waterproof housing is normally fastened, the touchscreen displays at least one of the information pop-up and the functional mode.

3. The waterproof device for diving according to claim 1, wherein when connection setting of the mobile terminal corresponds to the information pop-up, the touchscreen displays the functional mode.

4. The waterproof device for diving according to claim 1, wherein the touchscreen displays the information pop-up having at least one of a Bluetooth connection inducing pop-up and a preparation and caution information pop-up before diving and the functional mode having at least one of a diving mode and a camera mode.

5. The waterproof device for diving according to claim 1, wherein the processor determines whether the internal pressure is in an error range of pre-stored basic internal pressure, and when the internal pressure is in the error range of the pre-stored basic internal pressure, the touchscreen releases the functional mode and performs conversion into a home screen.

6. The waterproof device for diving according to claim 1, wherein the processor determines whether the waterproof housing is normally or abnormally fastened using a difference between the internal pressure after the waterproof housing has been closed and the basic internal pressure before the waterproof housing is closed.

7. The waterproof device for diving according to claim 1, further comprising a second pressure sensor configured to detect external pressure of the waterproof housing.

8. The waterproof device for diving according to claim 7, wherein the processor determines whether the waterproof device is currently located above water or under water using the detected external pressure.

9. The waterproof device for diving according to claim 8, wherein when it is determined that the waterproof device is currently located above water, the processor determines whether the waterproof housing is normally or abnormally fastened according to a difference value between the internal pressure and the external pressure.

10. The waterproof device for diving according to claim 9, wherein when it is determined that the waterproof housing is normally fastened, the processor determines whether water leakage occurs from the waterproof housing according to a determination as to whether the calculated inclination of the internal pressure at predetermined intervals is a negative number.

11. The waterproof device for diving according to claim 8, wherein when it is determined that the waterproof device is currently located under water, the processor calculates a water level of the waterproof device, based on the external pressure, and determines whether the waterproof housing is normally or abnormally fastened using the calculated water level and the difference between the external pressure and the internal pressure.

12. The waterproof device for diving according to claim 11, wherein when it is determined that the waterproof housing is normally fastened, the processor determines whether water leakage occurs from the waterproof housing according to a determination as to whether the calculated inclination of the internal pressure at predetermined intervals is a positive number.

13. The waterproof device for diving according to claim 1, wherein the processor detects whether the normal fastened state determination is performed, and based on pre-stored models of mobile terminals covered by insurance, thus determines whether the mobile terminal is covered by the insurance.

14. The waterproof device for diving according to claim 1, wherein the processor transmits water leakage occurrence to a customer center server.

15. A method for operating a waterproof device for diving having a mobile terminal for detecting internal pressure and an openable and closable waterproof housing adapted to detachably mount the mobile terminal thereonto, the method comprising the steps of:

detecting the internal pressure of the waterproof housing;

determining whether the waterproof housing is normally fastened using the detected internal pressure;

displaying at least one of an information pop-up and a functional mode;

calculating an inclination of the internal pressure at predetermined intervals; and determining whether water leakage occurs from the waterproof housing based on the calculated inclination of the internal pressure.

16. The method according to claim 15, wherein in the step of displaying at least one of an information pop-up and a functional mode, when it is determined that the waterproof housing is normally fastened, at least one of the information pop-up and the functional mode is displayed.

17. The method according to claim 15, wherein in the step of displaying at least one of an information pop-up and a functional mode, when connection setting of the mobile terminal corresponds to the information pop-up, the functional mode is displayed.

18. The method according to claim 15, wherein in the step of displaying at least one of an information pop-up and a functional mode, the information pop-up having at least one of a Bluetooth connection inducing pop-up and a preparation and caution information pop-up before diving and the functional mode having at least one of a diving mode and a camera mode are displayed.

19. The method according to claim 15, further comprising the steps of:

determining whether the internal pressure is in an error range of pre-stored basic internal pressure; and when the internal pressure is in the error range of the pre-stored basic internal pressure, releasing the functional mode and performing conversion into a home screen.

20. The method according to claim 15, wherein the step of determining whether the waterproof housing is normally fastened is carried out to determine whether the waterproof housing is normally or abnormally fastened using a difference between the internal pressure after the waterproof housing has been closed and the basic internal pressure before the waterproof housing is closed.

* * * * *